United States Patent [19]

Whidden, Jr.

[11] Patent Number: 5,190,238

[45] Date of Patent: Mar. 2, 1993

[54] REEL ASSEMBLY ESPECIALLY SUITABLE FOR HOLDING A SECTION OF AN OIL BOOM

[76] Inventor: Malcolm B. Whidden, Jr., P.O. Box 280, South Harpswell, Me. 04079

[21] Appl. No.: 804,409

[22] Filed: Dec. 10, 1991

Related U.S. Application Data

[62] Division of Ser. No. 571,148, Aug. 23, 1990, Pat. No. 5,087,152.

[51] Int. Cl.$^5$ .................. E02B 15/04; B63B 35/32
[52] U.S. Cl. .................. 242/106; 210/923; 242/68.4; 242/129.6; 405/66
[58] Field of Search ............ 242/74, 106, 68.4, 129.6; 405/63, 66, 67, 68, 69, 70, 71, 72, 168.3; 210/923

[56] References Cited

U.S. PATENT DOCUMENTS

| | | | |
|---|---|---|---|
| 2,342,773 | 2/1944 | Wellman | 405/68 X |
| 3,185,407 | 5/1965 | Lichtenstein | 242/68.4 |
| 3,399,786 | 9/1968 | Honeycutt . | |
| 3,532,219 | 10/1970 | Valdespino . | |
| 3,608,316 | 9/1971 | Manuel | 405/68 |
| 3,615,017 | 10/1971 | Valdespino . | |
| 3,703,811 | 11/1972 | Smith . | |
| 3,798,911 | 3/1974 | Öberg . | |
| 3,807,617 | 4/1974 | Tanksley | 405/66 X |
| 3,998,402 | 12/1976 | Christensen et al. | 242/106 |
| 4,089,178 | 5/1978 | Kinase et al. . | |
| 4,295,755 | 10/1981 | Meyers . | |
| 4,325,653 | 4/1982 | Teasdale . | |
| 4,340,321 | 7/1982 | Maheshwary et al. . | |
| 4,385,736 | 5/1983 | Yamamoto et al. | 242/74 X |
| 4,477,348 | 10/1984 | Ayers et al. . | |
| 4,480,800 | 11/1984 | Öberg et al. | 210/923 X |

OTHER PUBLICATIONS

Virkoma International Limited (Cowles, Isle of Wight, England) *Equipment Directory*, Issue 12 (English), Feb. 1989.

Hoyle Marine Ltd. (Wallasey, Wirral, England) *Product Range*, 4 pages, from Hyde Products, Inc., Cleveland.

Hoyle Marine Ltd. (Wallasey, Wirral, England) *Product Range*, 20 pages, from Hyde Products, Inc., Cleveland.

*Primary Examiner*—Randolph A. Reese
*Assistant Examiner*—Arlen L. Olsen
*Attorney, Agent, or Firm*—Mason, Fenwick & Lawrence

[57] ABSTRACT

A boom includes a plurality of boom sections joined end to end. Each boom section includes two or more parallel inflatable chambers which are joined with a weighted curtain which is reinforced for strength. Boom sections are stored compactly on respective reels. A substantial number of reels are arranged compactly in the hold of a carrier vessel which is smaller in size and has greater speed and maneuverability than vessels carrying known oil spill containment systems. Boom sections are consecutively unwound from their respective reels and connected end-to-end as they are deployed to form a continuous boom. The boom sections unwind naturally from the reels as the carrier vessel moves through the water away from a tender vessel holding the first end of the boom. The boom's deployment is controlled by a brake on an idler roller and a hydraulic crane's drive wheel on the reel, thus limiting manual handling to lighter-weight tasks. The carrier vessel, or, preferably, the tender vessel may inflate the chambers of the boom sections as they are deployed. The system is self-contained, as the carrier vessel is adapted to carry the tender vessel on its aft deck, releasing it when arriving at the spill site. Also, the tender can simultaneously deploy two substantially parallel booms, allowing an oil spill to be controllably segmented into smaller oil spills which are anchored or towed to calmer waters to await skimmer vessels.

15 Claims, 11 Drawing Sheets

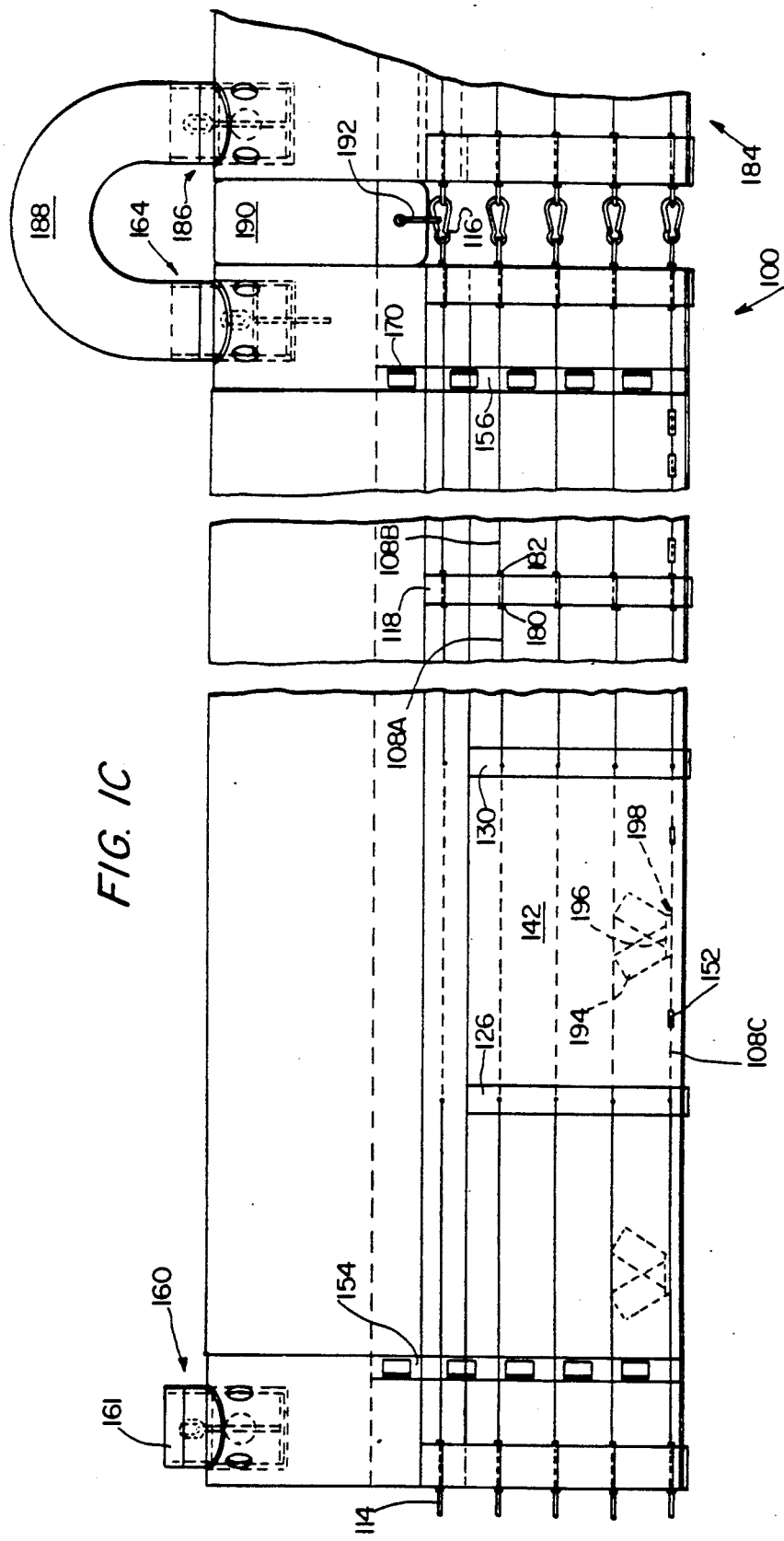
FIG. IC
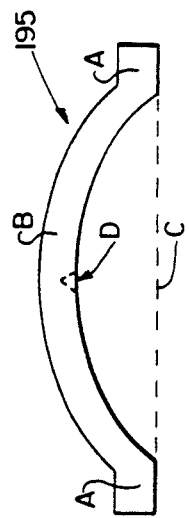
FIG. ID

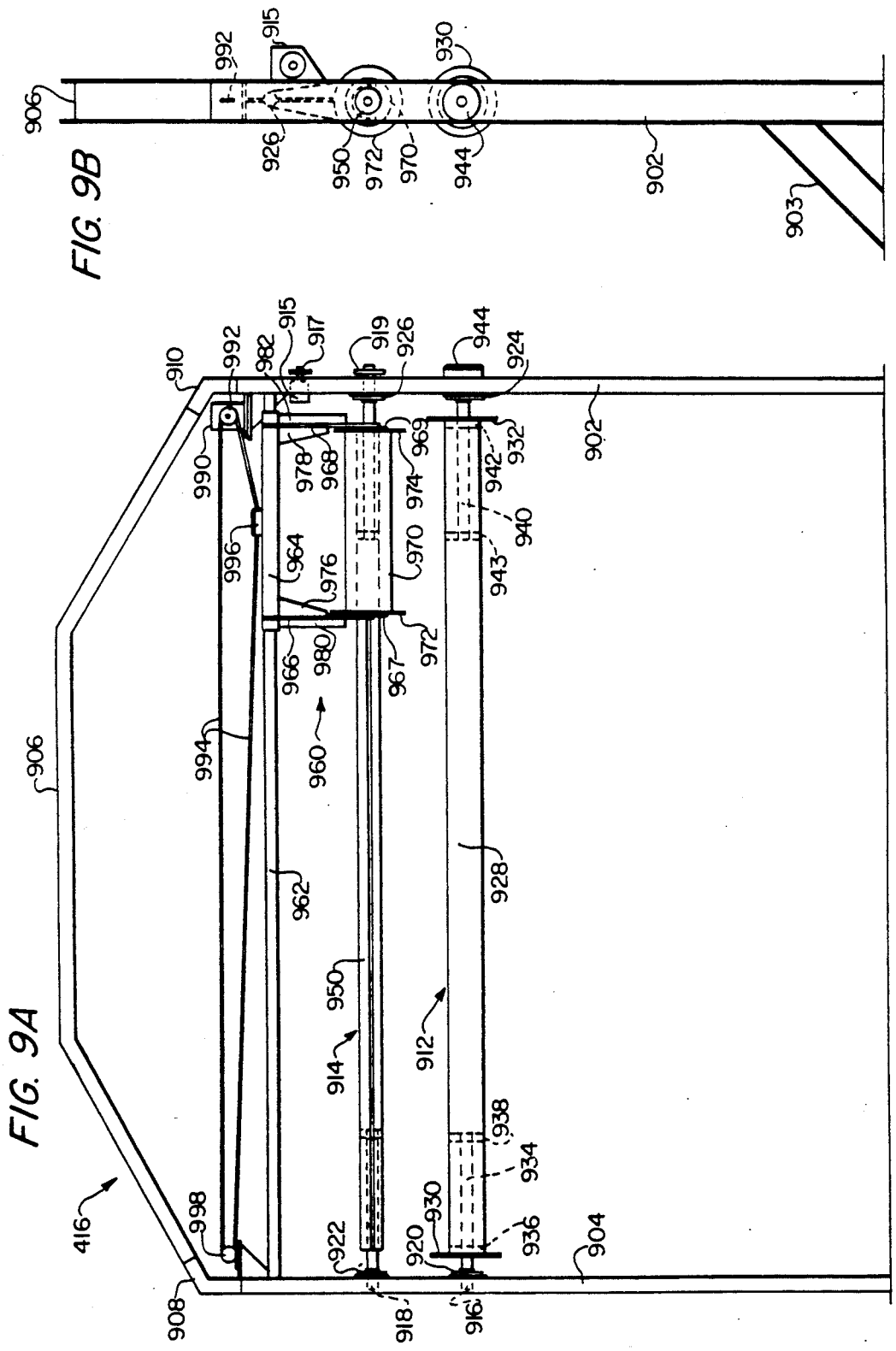

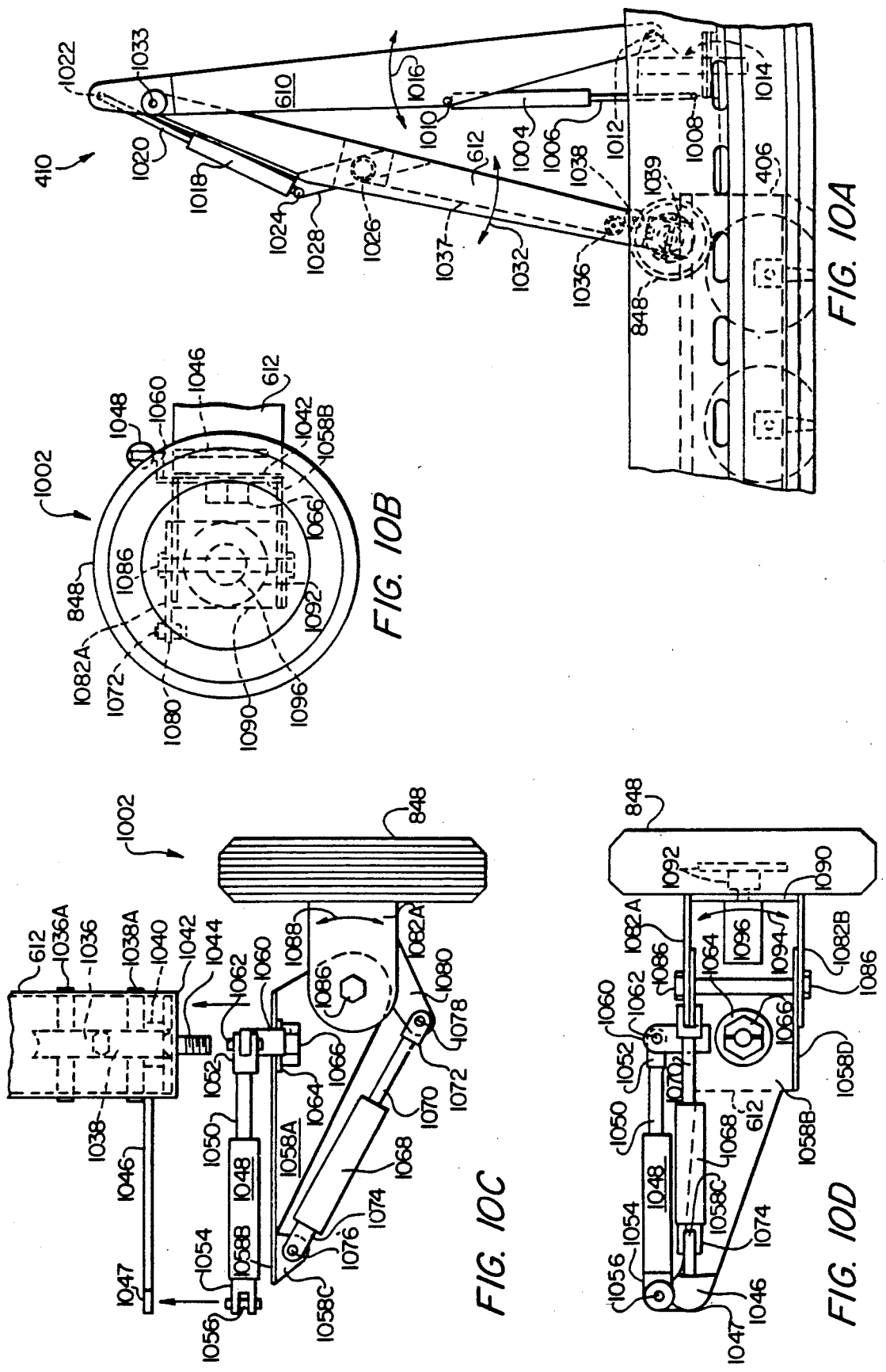

REEL ASSEMBLY ESPECIALLY SUITABLE FOR HOLDING A SECTION OF AN OIL BOOM

This application is a divisional of allowed U.S. patent application Ser. No. 07/571,148 filed Aug. 23, 1990, now U.S. Pat. No. 5,087,152, issued Feb. 11, 1992.

BACKGROUND OF THE INVENTION

1. Field of the Invention

The present invention relates to devices for containment of oil spills and the like, and to methods for deploying and retrieving them. More specifically, the invention relates to floating devices which may be quickly deployed to surround oil spills and the like, perhaps also dividing and/or moving the spills, allowing a skimming vessel to then remove them from the environment.

2. Related Art

Devices and methods for containing oil spills are known in the art. U.S. Pat. Nos. 3,352,219 and 3,615,017 (both to Valdespino), 3,703,811 (Smith), 3,798,911 (Oberg), 3,807,617 (Tanksley), 4,089,178 (Kinase et al.), 4,295,755 (Meyers) 4,325,653 (Teasdale), 4,340,321 (Maheshwary et al.), 4,477,348 (Ayers et al.), and 4,480,800 (Oberg et al.) illustrate various such devices and methods, and are incorporated herein by reference as if reproduced in full below.

Such known devices and methods suffer the drawbacks that a full boom of substantial size has been difficult to deploy, particularly in a timely fashion. The difficulty in deployment is often due to the necessity of manually deploying and retrieving them. Alternatively, the difficulty often originates in the complexity of deployment, requiring a substantial number of trained persons to be available at a particular geographic location on short notice to attempt to, timely contain an oil spill. Also, the deployment vessels had to be slow or inadequately maneuverable in order to deal with the weight and unwieldiness of known booms, thus inhibiting speedy deployment of a boom in a crisis.

Often, existing booms are stored on shore and have to be loaded on boats before initial deployment, occupying valuable time while a spill spreads. As the spill spreads, it becomes even more difficult to contain due to its increased size. Crews are often untrained to handle a large spill because of the work involved in having a realistic drill simulation.

Therefore, there is a need to provide means for containing oil spills and the like in a manner which is rapid, requires a minimum of trained persons, is adapted to easily train crews, and involves minimum bulkiness and weight.

SUMMARY OF THE INVENTION

The above limitations of known systems and methods are overcome by the present invention.

The present invention provides a boom including a plurality of boom sections joined end to end. Each boom section includes a plurality of parallel inflatable chambers which are joined with a weighted curtain which is reinforced for strength.

The boom sections are stored compactly on respective reels. A substantial number of reels are arranged in compact form in the hold of a carrier vessel which may be chosen smaller in size and with greater speed and maneuverability than vessels carrying known oil spill containment systems. The boom sections are consecutively unwound from their respective reels and connected end-to-end as they are deployed to form a continuous boom. The unwinding of boom sections from the plural reels may be by freewheeling as a deploying vessel moves ahead. Braking may be by a hydraulic drive wheel on the end of the boom as well as a brake on an idler roller, thus limiting manual handling to lighter-weight tasks such as inserting inflation valves as the reels are unwound. This allows a minimum number of trained persons to be available at any given geographic location. The carrier vessel, or, preferably, a tender vessel may inflate the chambers of the boom sections as they are deployed.

The carrier vessel is adapted to carry the tender vessel on its aft deck, releasing it when arriving at the spill site. The speed and capacity of the carrier vessel are chosen to allow it to rapidly arrive at the oil spill, carrying its tender and a number of boom sections which forms a boom of substantial length. The carrier is provided with a quantity of anchors, with Polyform floats for each, and enough anchor line for the expected depth of water. Thus, initial containment of an oil spill may be quickly achieved, minimizing its size pending arrival of additional boom sections. Total containment of even larger spills is allowed by easily loading additional reels into the carrier's hold from a dock, barge, wharf or another vessel.

The tender vessel may carry its own supply of reels of boom sections, further speeding deployment or providing deployment capability in shoal waters. The tender can simultaneously deploy two substantially parallel booms. Simultaneous deployment of two booms allows an oil spill to be segmented into smaller oil spills which are anchored or towed to calmer waters to await skimmer vessels.

The inventive system is self-contained on the carrier vessel, and is therefore ready for its mission as soon as a crew is on aboard. This system makes it easier to involve commercial fishermen in a contingency plan for handling spills; they know the bottom, currents, and wind conditions in their area. They see the effectiveness of a rapid response, and the simplicity of the system allows them to help in deployment, if necessary.

The present system is capable of retrieving known booms, after the inflatable boom has been deployed. A powered roller aboard the carrier may retrieve existing types of boom so they can be placed on pallets or in containers without heavy manual lifting; they can be lifted on or off the carrier by its hydraulic crane.

The inventive oil spill containment system is fast, simple, and dependable. Its use is simple, requiring a minimum of trained personnel. It is substantially automated, requiring minimal manual labor. The segmented nature of the boom allows realistic simulation drills to be staged, assuring availability of well-trained crews. The carrier vessel is as small and fast as feasible to still be effective in containing large oil spills. Wherever possible, the system uses off-the-shelf items to reduce cost.

Other features and advantages of the invention will become apparent to those skilled in the art upon a reading of the following Detailed Description of the Preferred Embodiments with reference to the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1C is a side view of the boom section 100 with a second boom section 184, illustrating their connection, along with further structural details of boom section 100;

FIG. 1D is a side view of a fitted piece for holding open a valve in FIG. 1C;

FIGS. 9A and 9B illustrate in forward-looking and starboard side views, respectively, a preferred embodiment of the carrier vessel's A-frame;

FIG. 10A illustrates the hydraulic crane 410 useful in embodiments of the present invention; FIGS. 10B, 10C, and 10D illustrate side, top, and end views, in partial cutaway form, of a drive wheel assembly used to control the rotation of various reels in the hold of the carrier vessel.

DETAILED DESCRIPTION OF THE PREFERRED EMBODIMENTS

Figure 1A:
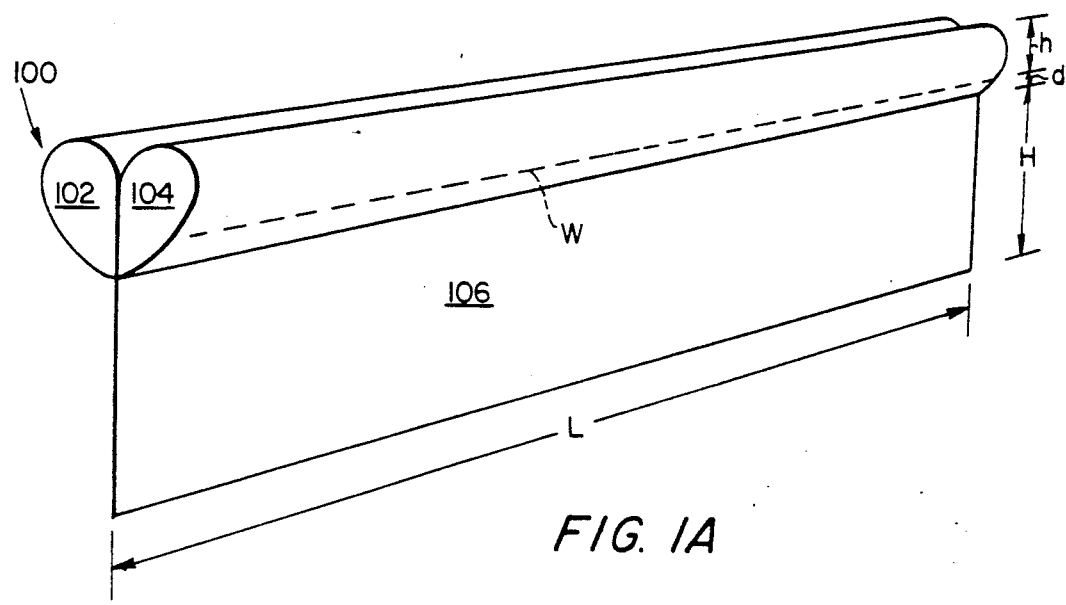
FIG. 1A illustrates the essential shape of a boom section 100 in one embodiment of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose. Also, directional indicators such as left, right, top, bottom, forward, aft, vertical, horizontal, north, south, and so forth, are employed for descriptive ease, showing relative orientations of components; they should not be interpreted as limiting in nature.

Certain elements may be omitted from the drawings and text for clarity or brevity because they have structures and functions known to those skilled in the art and are capable of implementation by such individuals; given the following description and accompanying drawing figures, those skilled in the art are readily capable of implementing the present invention using knowledge possessed or readily available to them.

FIG. 1A is a simplified perspective view of a boom section 100. For purposes of graphic simplicity, many structural features of the preferred boom section have been omitted in FIG. 1A, and the boom section is shown substantially foreshortened to fit on within a drawing sheet.

A plurality of such boom sections 100 are attached end to end to form a boom which is deployed to surround a spillage of oil or other floating substance. A seal in the form of a sheet is joined to successive boom sections near adjacent ends of successive chambers. The seal covers the space between consecutive boom sections, helping to minimize oil leaks between the boom sections. The manner in which the boom sections 100 are attached to form a boom, and the manner in which they are deployed to contain oil spills, are described in greater detail below.

As illustrated in FIG. 1A, boom section 100 includes first and second substantially air-tight, gas-filled chambers 102, 104. When the boom is deployed, the chambers are substantially parallel, adjacent tubular structures filled with air. When viewed from the end, the chambers together form a generally symmetrical heart-shaped figure whose two sides are separated to form chambers which are independently inflatable. Advantageously, the invention provides plural chambers to ensure that deflation of a single chamber due to puncture or other gas leakage does not cause a boom section to sink. This feature enhances the security of the boom as a whole, as the boom section having a chamber experiencing a puncture remains floating by virtue of the buoyancy provided by the remaining inflated chamber. Of course, when both chambers are inflated (as in normal operation), the boom rests higher in the water than many known booms, so that containment of the oil spill is possible in rougher seas.

A curtain 106 projects downwardly from these first and second chambers, ideally throughout their entire length. The curtain is constructed to remain substantially vertical, providing a barrier to passage of fluids floating on the surface of the water, even in rough seas.

The boom section 100 is designed to be deployed in the water, so that the gas-filled chambers 102, 104 provide substantial buoyancy to the boom section as a whole. As a result of the buoyancy provided by the air-filled chambers, the boom sections seek a water level indicated in FIG. 1A as dashed line W. Thus, assuming a calm water surface, the boom projects out of the water by a distance h, while the chambers are partially immersed to a depth d. Curtain 106 hangs down into the water beneath the chambers 102, 104 a distance H beneath the bottom of the chambers. In particular, curtain 106 is illustrated as having a vertical height H which may be chosen to be 22 inches. Typically, the water line W is a distance d at least 3–4 inches above the bottom of the chambers. This implies that, typically, the chambers project h=8 inches above the water's surface for containment of oil in rough seas. The length L of the boom 100 is in practice longer than that shown in the foreshortened illustration of FIG. 1A, and is typically 100 or 500 feet.

Figure 1B:
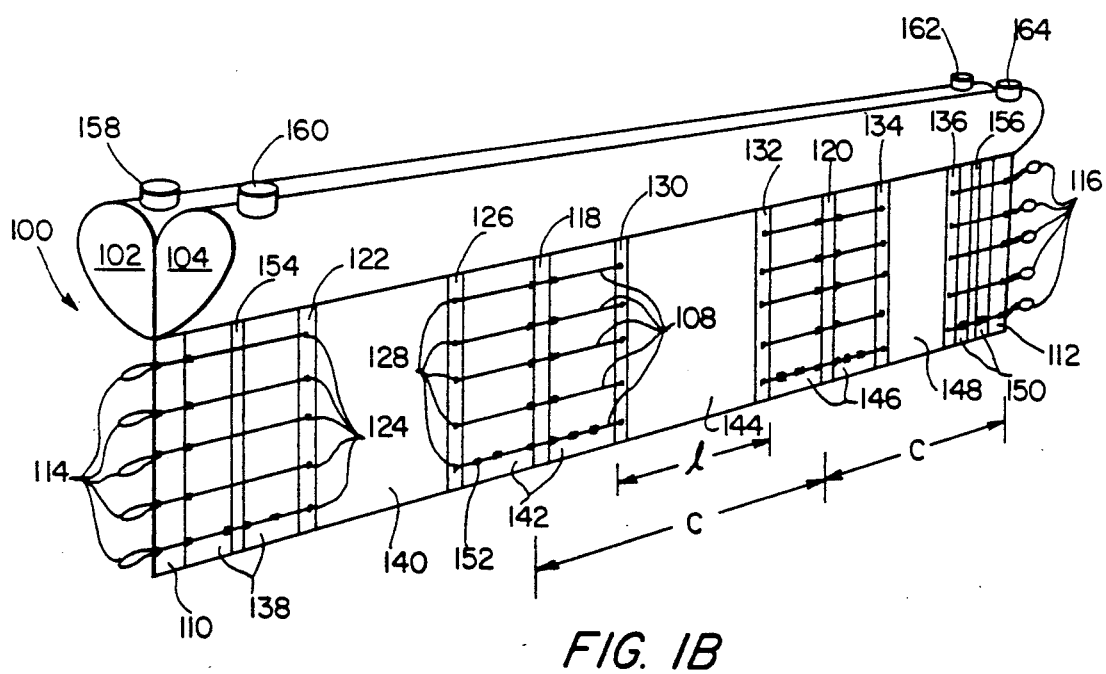
FIG. 1B illustrates more of the structural details of the boom section of FIG. 1A, including the physical support provided the curtain by longitudinal cables.

Referring now to FIG. 1B, structural details of the boom illustrated in FIG. 1A are illustrated.

Although FIG. 1B illustrates more structural details than FIG. 1A, the quantity of certain elements has been reduced for graphic clarity. Because the length L of any boom section may be 100-500 feet or more, the number of "panels" (such as a 2-foot panel 140, described below) in a 500-foot long boom section could exceed 250. Thus, FIG. 1B illustrates only seven panels in lieu of such a large number of panels which would be present in an actual embodiment.

In the preferred embodiment, curtain 106 is strengthened and supported by five cables 108 which run horizontally with the curtain. Cables 108 terminate at both ends of curtain 106 in end strips 110, 112. The ends of cable 108 are provided with first fastening means 114 such as loops or conventional snap connectors or the like, which are positioned near end strip 110. Similarly, at the other end of the curtain, second fastening means 116 are provided outside end strip 112. The first fastening means 114 attach to the second fastening means 116 of a next-adjacent boom section when the boom is deployed. Second fastening means 116 may include an intermediate ring disposed between the respective snap connectors, this arrangement being illustrated in more detail below, with reference to FIG. 1C.

Each of cables 108 may include a series of cable sections of length C, as illustrated in FIG. 1B. Successive cable lengths are joined at strips exemplified by strips 118, 120. In this manner, a first cable segment extends from end strip 110 to strip 118. A second cable segment extends from strip 118 to strip 120. Finally, in this simplified, foreshortened diagram, another cable segment extends from strip 120 to end strip 112. First fastening means 114 and second fastening means 116 are thus firmly joined by five sets of cables, each cable including cable segments which are joined at strips such as 118, 120.

The cables 108 extend horizontally along curtain 106 in an alternating fashion between panels determined by spaced vertical strips 122, 126, 130, 132, 134, 136. The cables extend from end strip 110 on a side of the curtain which is visible in FIG. 1B. However, as the cables reach strip 122, they pass through respective holes 124 in the strip, so that the cables are hidden from view in FIG. 1B until they reach a strip 126. At strip 126, the cable pass through holes 128 so that they are again visible in FIG. 1B. Similarly, the cables pass through strips 130, 132, 134, and 136 before terminating at end strip 112.

Strips 122, 126, 130, 132, 134, and 136 divide the curtain 106 into a plurality of panels 138, 140, 142, 144, 146, 148, and 150. Each panel has cables 108 on a side opposite that of the preceding or successive panel. This alternating arrangement of cable support provides the advantage of greater strength of the curtain when the boom section is deployed. Specifically, assume a higher water pressure is present on the near side of the boom section 100, due to such forces as a net velocity of water in the direction entering the plane of FIG. 1B or due to the boom being pulled inward to contain an oil spill. Assuming the water presses substantially equally on each of the panels 138, 140 . . . 150, the material of panels 140, 144, and 148 is supported on its opposite side (hidden from view in the drawing) by the cables. However, the material of panel 138, 142, 146, and 150 are pressed further from the (visible in the drawing) cables, and in this respect may be considered "less well-supported lengths" of the boom section.

In the illustrated embodiment, the length "l" of each of the panels 138 : . . 150 may be chosen to be small, preferably two feet. Thus, the less well-supported lengths of curtain 106 (namely, panels 138, 142, 146, and 150) do not extend very far along the length of the boom section. Also, each of the less well-supported panels is surrounded by other panels having greater support provided by the cables. In this manner, the cables provide physical support to all panels in the curtain. This choice of small panel length minimizes the focusing of pressure in selected panels, thereby increasing the overall strength of the curtain.

The bottom one of the five cables 108 is preferably threaded with a plurality of evenly-spaced lead weights 152 to add stability to the boom when it is deployed. By adding mass to the bottom of the curtain, lead weights 152 help to assure that the curtain 106 hangs substantially vertically beneath chambers 102, 104. Optionally, metal chains may be added to the curtain to provide more ballast. With this arrangement, a substantially vertical wall of boom sections 100, joined together in series by first and second fastening means 114, 116, may encircle an oil spill, even in rough seas, in the presence of significant currents, or when the spill as a whole is "towed" to a different location for holding or skimming.

Strips 154 and 156 are disposed near the ends of curtain 106 near end strips 110, 112, respectively. Bonded to strips 154, 156 are steel members formed in the shape of an "L". These steel L's are designed to mate with magnets which are placed on corresponding locations on a seal 226, to be described below, with respect to FIGS. 1C, 2A and 2B.

Also illustrated in FIG. 1B are four valve assemblies 158, 160, 162, and 164. First and third valve assemblies 158, 162 are located on the top side of first chamber 102, near opposite ends thereof. Similarly, second and fourth valve assemblies 160, 164 are located on the top side of the second chamber 104 near opposite ends thereof. These valve assemblies allow inflation of the chambers 102, 104 at the time of deployment. The advantages of having two valve assemblies for each chamber, rather than one valve assembly, is explained in greater detail below. The structure and use of the valve assemblies are described in greater detail below, with respect to FIGS. 2A, 2B, and 2C.

In the preferred embodiment, the length C of cable segments is advantageously 50 feet. The length of l of each panel is two feet. The material forming the chambers and curtain may advantageously be 1/32-inch thick neoprene. However, where greater strength is required due to anticipated focusing of stress, such as the ends of the boom sections, and sleeves where the valves are inserted, the strips may be neoprene of greater thickness. The ends and the sleeves may be 1/16-inch neoprene. Strips 122, 126, 130, 132, 134, 136 may be 1/16-inch thick neoprene vulcanized to the curtain. The widths of these strips may be advantageously chosen to be two inches. Strips 118 and 120 may be three lengths of ⅛-inch by 2 inch neoprene which is vulcanized to the curtain at fifty foot intervals. The cables 108 may advantageously be 750 pound test nylon monofilament, available from Hi-Seas Industries, Inc. of N.Y., N.Y. 10013-1338. First fastening means 114 may be a loop in the Nylon monofilament held by an aluminum sleeve set with a crimping tool. These loops 114 are joined by stainless steel Fast Eye Snap Hooks 116 of a succeeding or previous boom section.

Referring now to FIG. 1C, various details not previously explained in the illustration of FIG. 1B are now presented.

First, the manner in which consecutive segments of cable 108 are affixed may be seen by referring to strip 118 (FIG. 1C). A first segment of cable is labeled 108A, and a second segment of cable is labeled 108B. Cable segment 108A extends from the left to overlap strip 118, being outside the strip to be visible in FIG. 1C. Conversely, cable segment 108B approaches strip 118 from the right, and extends beneath it, so that it is not visible behind the strip in FIG. 1C. The end of cable segment 108B is attached to cable 108A by a fixing means 180. Similarly, the end of cable 108A is firmly affixed to cable segment 108b by a second fixing means 182. The two fixing means and two cable segments thus "trap" strip 118, which is in turn vulcanized to the curtain.

In this manner, cable segments 108A and 108B are fixed to one another at a location on the curtain which is fixed by the location of strip 118. Fixing means 180 and 182 may be metal pieces which are securely affixed to the cables 108A and 108B by means of a crimping tool. Cable immediately adjacent fastening means 114 and 116 may also be fastened to end strips 110 and 112, respectively, by a similar crimping arrangement. Specific fixing means allowing this crimping may be implemented by using part no. HSC-600 manufactured by Hi-Seas Industries, Inc. of N.Y., N.Y. 10013-1338. In manufacture of large quantities, an equivalent powered version would be used.

Also illustrated in FIG. 1C is a preferred means for simultaneously inflating plural adjacent boom sections. A boom section 100 is illustrated adjacent a succeeding boom section 184. Boom section 100 includes a fourth valve 164 (as illustrated above, in FIG. 1B). Similarly, succeeding boom section 184 includes a valve assembly 186. A neoprene tube 188 connects valve assemblies 164 and 186.

Valve 164 is held open by a notched, shaped piece 195 (FIG. 1D). Piece 195 may be of nylon or similar material that is placed across a ring nut 214 (FIG. 2A, below) and into opposing ports 220. As shown in FIG. 1D, a preferred fitted piece 195 is essentially shaped like a partially flattened uppercase Greek letter Omega (Ω) 5.625 inches in length when not stretched or compressed. The two side arms A are 0.5×0.5-inch extensions from a center arc B. Arc B has an inside diameter of 3.0625 inches from an imaginary center located 2 inches below a base plane C, and an outside diameter of 3.0625 inches from an imaginary center 1.4375 inches below the base plane C. A small countersink D at the center of the inside arc allows stabilization of the position of the ring nut. The piece may be made of 0.5-inch thick nylon for a proper combination of flexibility during insertion and removal, firmness after insertion, and durability.

Returning to discussion of FIG. 1C, the open position of valve 164 allows gas communication between the two boom sections' chambers. When tube 188 is removed, valve 186 is closed. Valve 164 closes when the shaped piece is removed. This removal process only takes seconds. The structural and functional details of the valve assemblies is described below, with respect to FIG. 2A.

With the arrangement of boom sections 100 and 184 and the neoprene tube 188 shown in FIG. 1C, gas (normally ambient air) may be pumped in through valve assembly 160, thus filling the chamber within boom section 100. Because valve 164 is maintained in an open position, air being pumped into the chamber of boom section 100 is also forced through the neoprene tube 188, forcing valve 186 into its open position. Air then flows into the chamber of succeeding boom section 184. In this manner, affixing a single gas pump to valve assembly 160 allows inflation of two or more succeeding boom assemblies 100, 184, and so forth.

After inflation of the chambers of the plural succeeding boom sections has been completed, neoprene tube 188 is removed, as is the shaped piece holding open valve 164. The valves close, preventing air from escaping the chambers after the boom is deployed.

Also illustrated in FIG. 1C is a spacer float 190. Spacer float 190 fits between the chambers of adjacent boom sections 100 and 184, and is attached to the fastening means 116 by means of a metal ring 192. Ring 192 assures that spacer float 190 is in the proper vertical position for performing its sealing functions. Spacer float 190 is illustrated in cross-section in FIG. 3.

Spacer float 190 provides a sealing function, helping seal 226 (FIGS. 2A and 2B, below) to prevent oil from escaping between the chambers of adjacent boom sections. The spacer float also provides added buoyancy to the boom sections near their ends, where the materials are thicker and heavier.

A 1/16-inch by 2-inch neoprene support strip 194 is provided in the middle of panel 142 to support the bottom cable 108C which supports lead weights 152. Support strip 194 is folded over on itself at an angle of seventy-five degrees to present a V-shaped outline, as illustrated. The support strip is vulcanized to the curtain above horizontal line 196, the support strip thus forming a horizontal channel 198 through which the weighted cable 108C is threaded. A support strip such as support strip 194 is provided on each two-foot panel 138, 140, 142, 144, 146, 148, 150 (FIG. 1B), to relieve stress placed on holes 124 in vertical strips 122, 126, 130, 132, 134, 136.

Vertical strips 154 and 156 are disposed near the ends of curtain 106 near end strips 110, 112, respectively. Bonded to strips 154, 156 are steel members 170 formed in the shape of an "L" when viewed from above or below. The short arm of the "L" 170 projects outward from the curtain at the end of the longer arm which is closest to the end of the curtain. These steel L's are designed to mate with magnets which are placed on corresponding locations on a seal 226, to be described below, with respect to FIGS. 2A and 2B. In the illustrated boom section, the magnets are located eight inches from the end of the boom section.

A neoprene cap 161 is shown atop valve 160 in FIG. 1C. This cap is used if the valves show signs of leakage, or if there is need to keep water out of the valve interior 201 (FIG. 2A) in case of rain, stormy weather, or freezing spray. This cap 161 slips over the valve and may be held in place with a hose clamp.

Figure 2A:
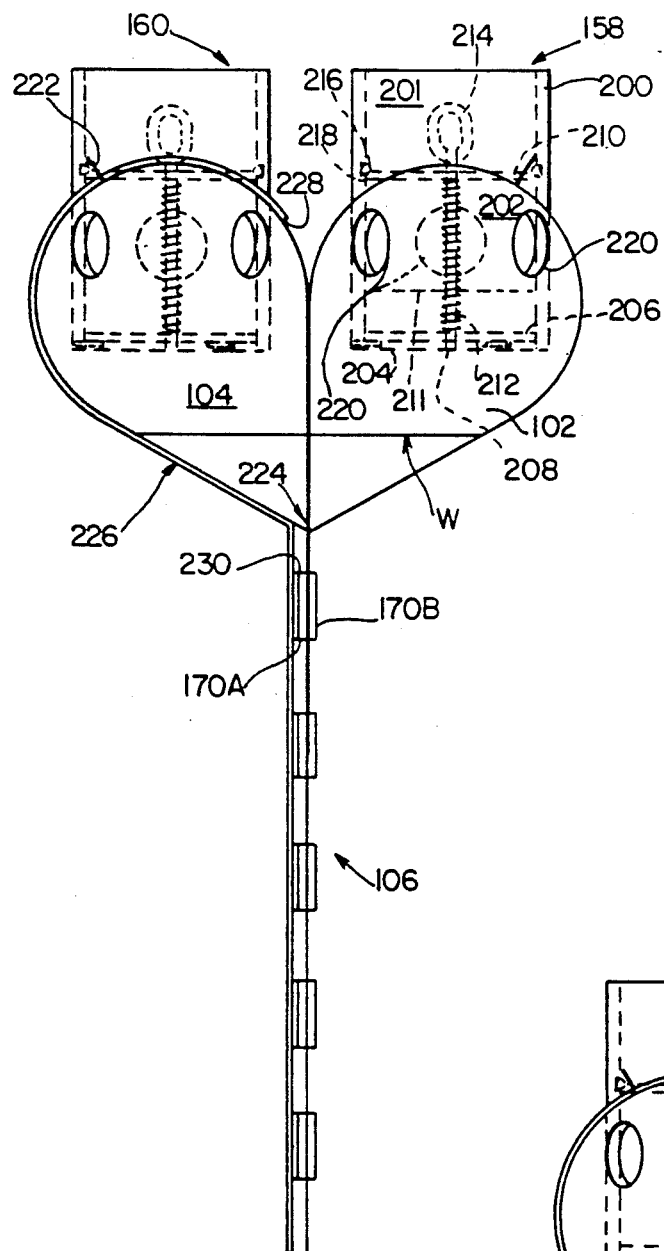
FIG. 2A illustrates in cross section the part of boom section 100 including valve assemblies 158 and 160.
Figure 2B:
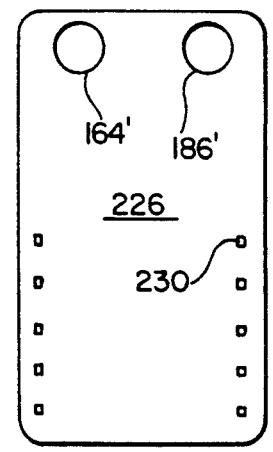
FIG. 2B illustrates a side view of the seal 226 from FIG. 2A, unfolded for purposes of illustration.
Figure 2C:
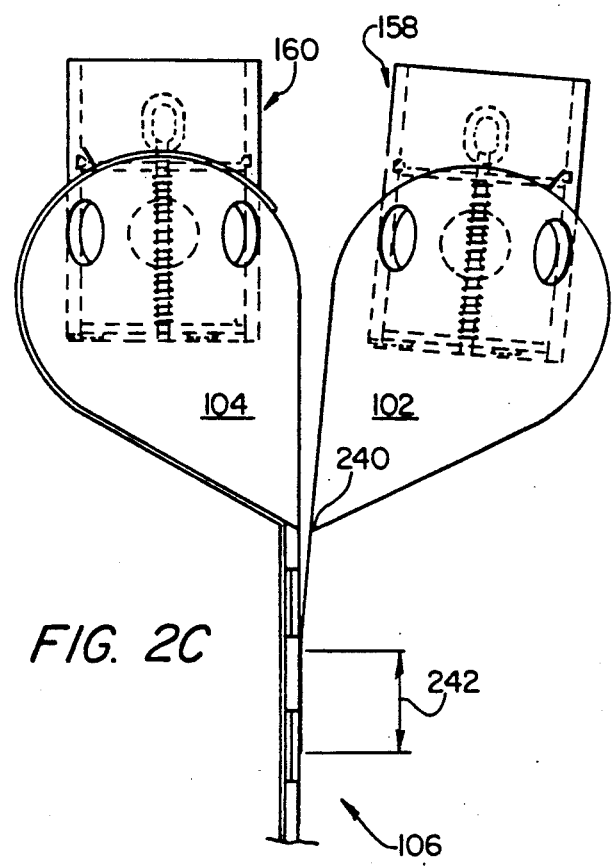
FIG. 2C illustrates in cross section the structures of FIG. 2A, but with the chambers slightly separated for purposes of illustration.

Referring now to FIGS. 2A and 2C, cross sectional views of the boom section and valve assemblies are illustrated.

Referring now to FIGS. 2A, valve assemblies 160 and 158 are illustrated inserted into chambers 104 and 102, respectively.

Referring especially now to valve assembly 158 as an illustrative example, the valve assembly includes a right circular cylinder 200 whose bottom side holds a base plate 206 which guides a vertically oriented valve stem 208 and also supports a spring 212. The valve assembly also includes a movable diaphragm 210 having a center hole through which valve stem 208 passes. Valve stem 208 terminates in a ring nut 214.

Diaphragm 210 divides the interior of cylinder 200 into upper and lower chambers 201 and 202, respectively. Diaphragm 210 is normally urged upward by a spring 212 which forces it away from base plate 206. The upward motion of diaphragm 210 is restricted by an O-ring 216 which is inserted securely in a groove 218 formed in the inner wall of cylinder 200. In this manner, absent any downward force on diaphragm 210, spring 212 forces diaphragm 210 into contact with O-ring 216 so as to prevent air contained within boom chamber 102 or in valve chamber 202 from escaping. Diaphragm 210 is held against O-ring 216 by air pressure from the chamber which is about 4 to 5 times as much as pressure exerted by the spring; the spring's main function is to initially close the valve so that the air pressure can keep the valve closed.

Cylinder 200 is provided with a plurality of ports 220, disposed approximately midway between groove 218 and the base plate 206 at the bottom of the cylinder 200. Ports 220 provide continuous air communication between boom chamber 102 and the interior of the cylinder 200.

To force air into the chamber, an air pump such as a six-inch centrifugal blower (not shown) is connected to cylinder 200 in an air-tight manner. The force of air from the blower forces diaphragm 210 downward toward base plate 206, against the force of spring 212. With sufficient pressure applied by the blower, diaphragm 210 is forced downwardly to a vertical position 211 so that ports 220 allow communication between cylinder top chamber 201 and boom chamber 102. In this manner, air is pumped into boom chamber 102. As the blower is removed from cylinder 200, the force of spring 212 causes diaphragm 210 to return to its sealing position in contact with O-ring 216.

Preferably, chamber 102 is inflated to a pressure of ½–¾ pounds per square inch (15–21 inches of water pressure), adding to the force on the bottom side of diaphragm 210 to keep it sealingly pressed against O-ring 216. A suitable blower is model no. Design 53 #B5, available from Chicago Blower Corp. of 1675 Glen Ellyn Rd., Glendale Heights, Ill. 60139. A blower capable of moving 1200 cubic feet per minute of air provides adequate speed of inflation when rapid deployment is desired.

Cylinder 200 may be a 5-inch schedule 80 PVC pipe, 5.563-inch outside diameter. Diaphragm 210 and base plate 206 may be ¼-inch aluminum disks. Base plate 206 may be affixed to the cylinder by ⅛-inch stainless steel push pins. Ring nut 214 may be a ¼-inch in diameter.

Also illustrated in FIGS. 2A, 2B, and 2C is a seam 222. The seam is advantageously located at a point which is directly opposite to an apex 224 of the chamber 104. This placement of the seam allows the boom section to lie in a flat position when deflated and wound on a drum when the boom section is not deployed. This design also helps prevent cracking of the boom material when stored for long periods of time.

A seal 226 covers the chamber 104 starting near its intersection with chamber 102, illustrated at point 228. From its starting point 228, seal 226 projects upward over the top of the chamber and finally downwardly, to join with the left face of curtain 106. As illustrated in FIGS. 2A and 2B, seal 226 is a substantially rectangular sheet of 1/16-inch neoprene.

Seal 226 has bonded to it two sets of five rectangular magnets, one of which is illustrated as element 230. Magnets 230 are disposed to mate with the L-shaped steel inserts 170 which are bonded to vertical strips 154, 156 (FIG. 1C). The seal's magnets are located a horizontal distance apart which is determined by two times the distance of the steel L's from the ends of the boom sections plus the separation between succeeding boom sections as determined by first and second fastening means 114, 116.

FIG. 2A illustrates that there may be two steel L's 170A and 170B, allowing a seal 226 to be affixed on either side of the curtain. This allows flexibility as to which side of the boom to which the seal is attached; the seal should be attached to the side of the boom facing the spill. Choice of which side of the boom the seal is made, depending on whether the boom is being deployed in a clockwise or counterclockwise direction around the spill. In the illustrated embodiment, the seal is chosen to be affixed to the left side of the curtain, thus employing steel "L" 170A. The arm of the "L" which projects away from the curtain "catches" the magnet 230, helping to ensure that the seal does not slip off by being pulled away from one boom section by the relative motion of an adjacent boom section.

Two apertures 164' and 186' (illustrated in FIG. 2B) also help to locate and secure seal 226. Apertures 164' and 186' allow room for valve assemblies in adjacent boom sections (such as 164 and 186 in FIG. 1C, respectively) to fit through the seal.

In this arrangement, seal 226 provides a sealing function to cover the gap shown between adjacent boom sections 100 and 184 (FIG. 1C). Most or all of the depth of the oil spill will contact the portion of the seal which is adjacent the inflatable chamber 104. However, seal 226 is adapted to effectively seal oil on one side of the boom, even in rougher seas, due to the downward extent of the seal to cover gaps between the ends of the curtain 106.

Referring now to FIG. 2C, the attachment of chamber 102 to the curtain 106 is more clearly illustrated. Chambers 102 and 104 are illustrated as separated from one another for purposes of illustration; when deployed, chambers 102 and 104 are normally in contact. The material forming the wall of chamber 102 extends downwardly from apex 240 to join with the curtain 106 along a segment illustrated as element 242. Segment 242 may be a 3-inch segment of neoprene which is vulcanized to the neoprene curtain. The segment 242 is approximately 4 inches from the apex of the chamber.

Figure 2D:
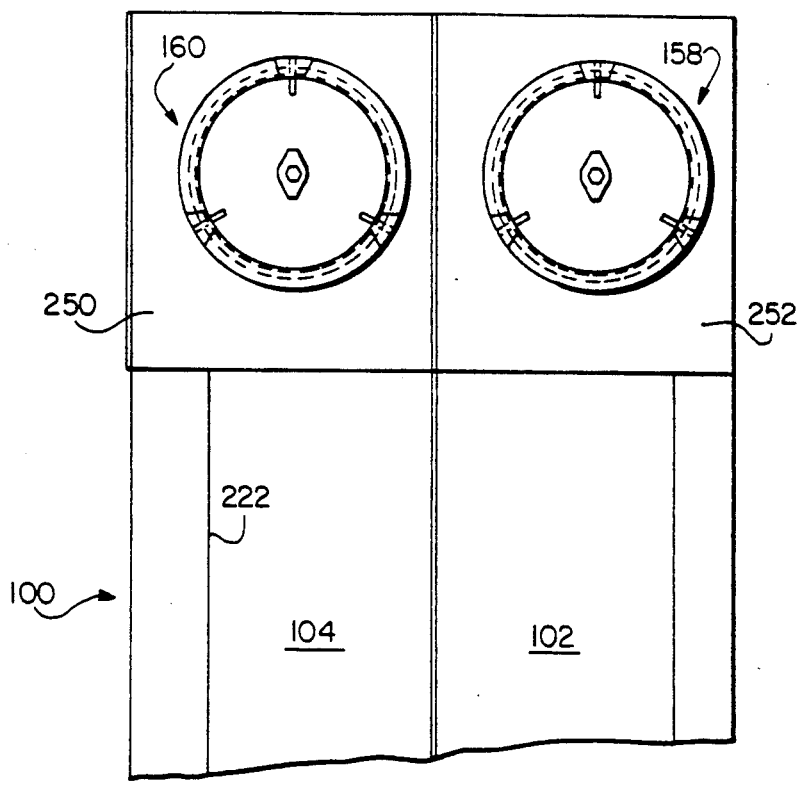
FIG. 2D is a top view of the portion of boom section 100 which contains valve assemblies 158 and 160.

Referring now to FIG. 2D, a top view of the boom section 100 with valve assemblies 160 and 158 are illustrated. Also illustrated in FIG. 2D is end cover 250 which has been omitted from previous drawing figures for purposes of clarity. As shown in FIG. 2D, end cover 250 seals the end of second chamber 104 in an air-tight fashion. Another end cover 252 serves a similar function for chamber 102.

End covers 250 and 252 are made of a thicker material (1/16-inch neoprene) than that generally forming the chambers 102 and 104 (1/32-inch neoprene). This stronger construction is due to the expected experience of greater stress during insertion of the valve assemblies, inflation of the chambers, deployment, and mechanical friction against spacer floats 190.

The valve assemblies may be attached to the chambers/end covers by stainless steel hose clamps (not explicitly shown) as the boom sections are being deployed. The first set of valve assemblies (with hose clamps) is removed after retrieval prior to re-winding onto spools, so that the boom sections are able to be tightly wound onto reels. However, the valve assemblies which are on the "loose" end of the boom sections wound on the reels may remain attached. This continued attachment of the valves saves time when rapid deployment of the boom is desired.

Figure 3:
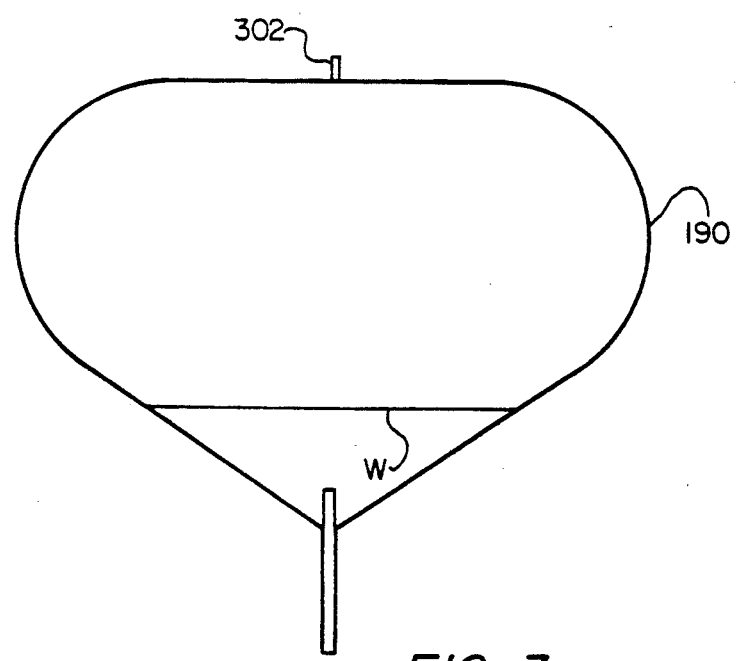
FIG. 3 illustrates in cross section the spacer float 190 which was shown in FIG. 1C.

FIG. 3 illustrates in the cross section the spacer float 190 which was shown in side view in FIG. 1C. As illustrated in FIG. 3, the spacer float cross section is essentially a heart-shaped figure which substantially matches the cross-section of two chambers 102, 104 when they are inflated. This shape allows the spacer float 190 to seal the space between adjacent boom sections and provide physical support for seal 226 (FIGS. 2A, 2B). The spacer floats may be inflated and deflated with, for example, a stem valve 302.

Figure 4:
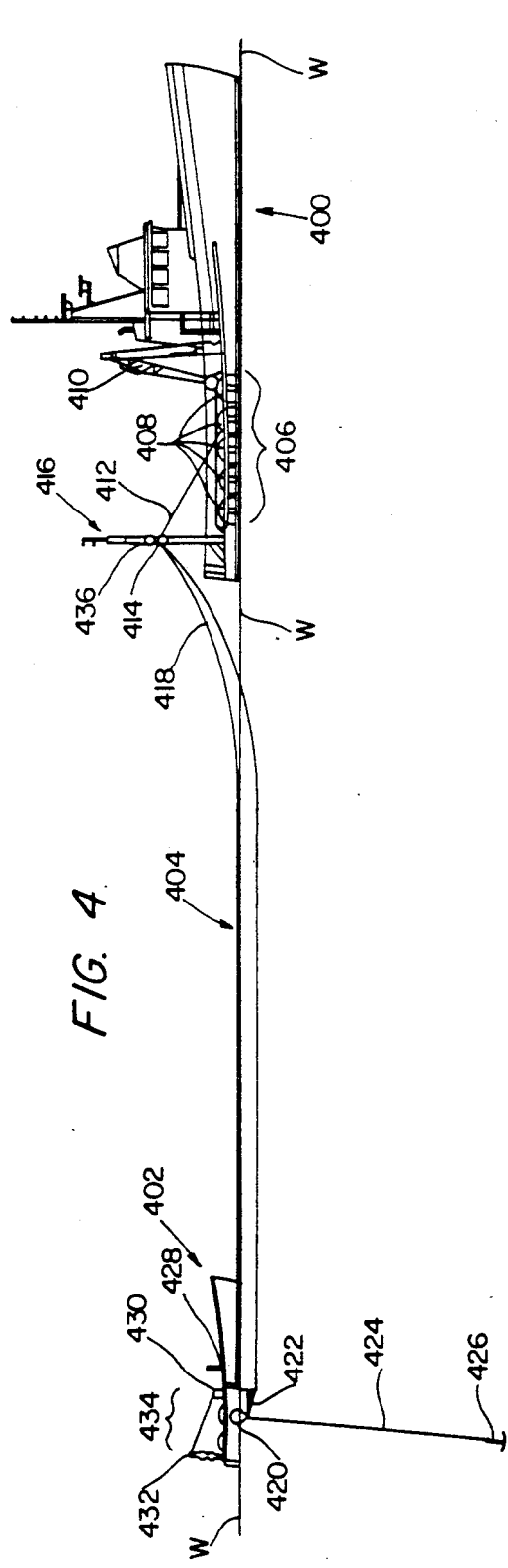
FIG. 4 illustrates a carrier vessel 400 and a tender vessel 402 deploying a typical boom section.

FIG. 4 illustrates a carrier vessel 400 and a tender vessel 402 deploying a typical boom section 404. The structural details of carrier 400 and tender 402 will be described in greater detail below. However, at this point, the deployment of a single boom section 404 is presented for purposes of illustrating certain general concepts of the invention.

Carrier 400 has hold section 406 which contains a plurality of reels 408. Each reel 408 has wound around it a boom section such as boom section 404. Boom sections extend up path 412 above a bottom roller 414 on a vertical carrier A-frame 416. From roller 414, the boom section hangs down along a path 418 down to the water, whose surface is indicated by element designator W. A-frame 416 on carrier 400 has a second, top roller 436 which is not used during deployment.

At the opposite end of boom section 404, a flotation device 420, such as a "polyball" or foam device, floats. A suitable flotation device 420 may be a Polyform Buoy, from Polyform USA Ltd., 7030 So. 224th, Kent, Wash. 98032. The polyball is connected to the boom section by a plurality of cables 422. Each of the plurality of cables may advantageously be connected to the first fastening means 114 (FIG. 1B) on the boom section. Extending downward from polyball 420 is an anchor line 424 having at its lower end an anchor 426. Typically, a carrier brings at least fifty, 30–40 pound anchors, with a corresponding number of polyballs.

Anchor 426 helps to ensure that the end of boom section 404 remains at a substantially stationary point in the water. Polyball 420 provides buoyancy for the end of the boom section, so that the anchor does not pull a portion of the boom section underwater.

Tender 402 is illustrated with inflation lines 428 connected between an on-board portable diesel-driven blower and the boom sections. The inflation lines allow inflating the boom section so that they do not sink during deployment. Towing post holder 430, tender A-frame 432, and tender hold 434 are also illustrated, although they are not actively used at the time illustrated in FIG. 4. The detailed structure and operation of these components will be described in greater detail below.

FIG. 4 illustrates the beginning of the process of deploying a boom having several boom sections. However, in many instances, it is desirable to divide an oil spill into smaller sections, after it has been contained by boom sections according to the present invention. For example, dividing the contained oil spill into smaller sections allows the smaller sections to be towed to areas where the water is calmer allowing the oil to be skimmed from the water surface. To illustrate the manner in which a oil spill may thus be divided, FIG. 5 is provided.

Figure 5:
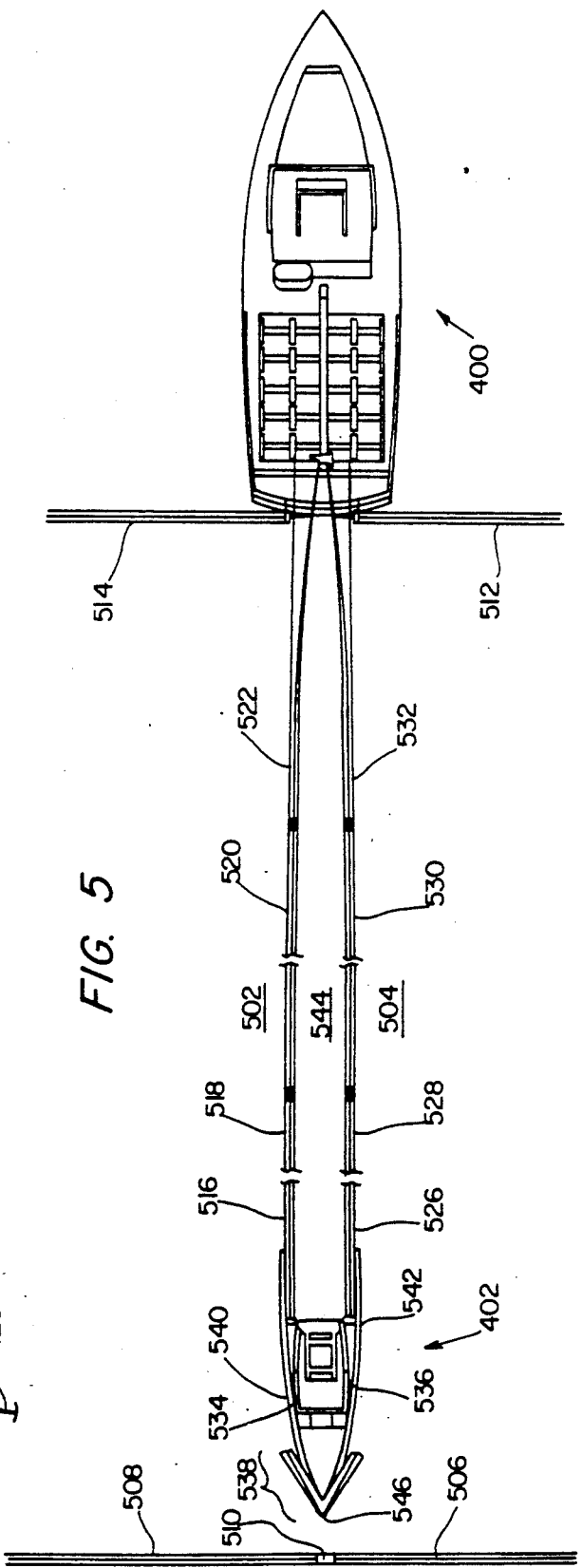
FIG. 5 is a top view of a carrier and a tender in the process of deploying two matched sets of booms to divide an oil spill into a first "north" area 502 and a second "south" area 504.

FIG. 5 is a top view of a carrier 400 and a tender 402 in the process of deploying two matched sets of booms to divide an oil spill into a first "north" area 502 and a second "south" area 504. (The directional indicators "north", "south", and so forth, are merely provided for ease of reference and are not intended to be limiting or descriptive of any necessary orientation of the booms or vessels in practice.) It is assumed for this discussion that the oil spill has been at least partially contained by successively connected boom sections, only four of which are illustrated. Southwest boom section 506 and northwest boom section 508 are joined at a point 510 to provide a west barrier to the oil spill. Similarly, southeast boom section 512 and northeast boom section 514 are connected at a point adjacent carrier 400, thus providing an east barrier to the oil spill.

To divide the oil spill into north area 502 and south area 504, tender 402 proceeds westwardly, pulling behind it two sets of boom sections. A first, north set of boom sections includes boom sections 516, 518, 520, and 522. Similarly, a south set of boom sections includes boom sections 526, 528, 530, and 532. The first set of boom sections is towed by towing post 534 on the tender, whereas the second set of boom sections is towed by towing post 536.

In the oil spill splitting scenario illustrated in FIG. 5, the bow of tender 402 is outfitted with a splitter 538 and right and left side booms 540 and 542. These side booms may be short sections of single-chamber booms. Side booms 540, 542 are attached to the forward towing post inside the aft end of the splitter by means of stainless steel fast-eye snaps to shackles in holes of towing posts, as described in greater detail below. The splitter 538 is preferably "V" shaped, and is attached to the bow of the tender so as to plow through the water. The splitter 538 and side booms 540, 542 surround tender 402.

In addition to the splitting scenario of FIG. 5, side booms 540 and 542 are also used if the tender is making a split one boom long. In scenarios in which boom is deployed from reels on the tender and inflated by the carrier (the opposite of the normal deployment scenario), the side booms are needed because the boom being run out does not reach the water until it is 15 or 20 feet from the tender, giving the oil a chance to get into the clean area between parallel boom sections.

Returning to discussion of FIG. 5, as tender 402 proceeds westward, splitter 538 divides the oil spill into north and south areas 502, 504, with the two sets of boom sections defining a narrow inner area of clean water surface 544.

Splitter 538 is provided with a push post 546 at its foremost point, allowing tender 402 to push the west barrier 506, 508 away from the oil spill. After the west barrier has been pushed away from the oil spill, boom section 508 may be joined with boom section 516, and boom section 506 may be joined with boom section 526. It is preferable from the point of view of containing the oil spill that the connecting of the boom section be performed in clear water so that during the brief time in which sections 508 and 506 are separated, no oil escapes. Preferably, the tender is equipped with at least two blowers, because of the large number of chambers to inflate.

It is envisioned that a particularly useful means of containing a spill would to be deploy a boom around and across the leeward end of the spill. After oil had flowed to a desired depth, it may be split off in a manner described with respect to FIG. 5; the spill may then be moved to a more appropriate anchorage. This process may be repeated as many times as required.

Figure 6A:
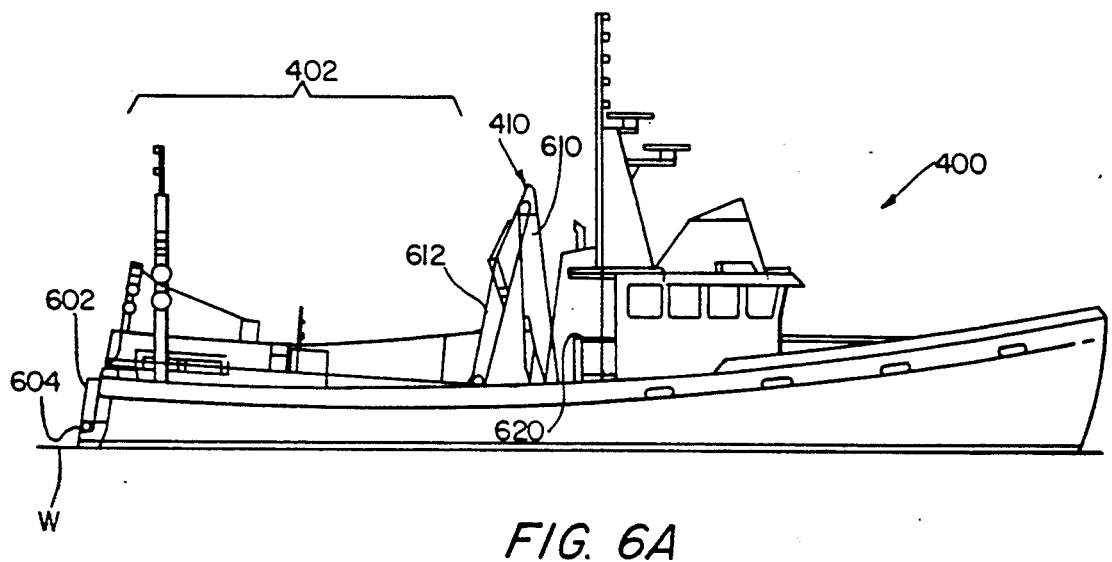
FIGS. 6A and 6B are side and top views of the carrier vessel 400 with the tender vessel 402 mounted on its afterdeck with a splitter 538.
Figure 6B:
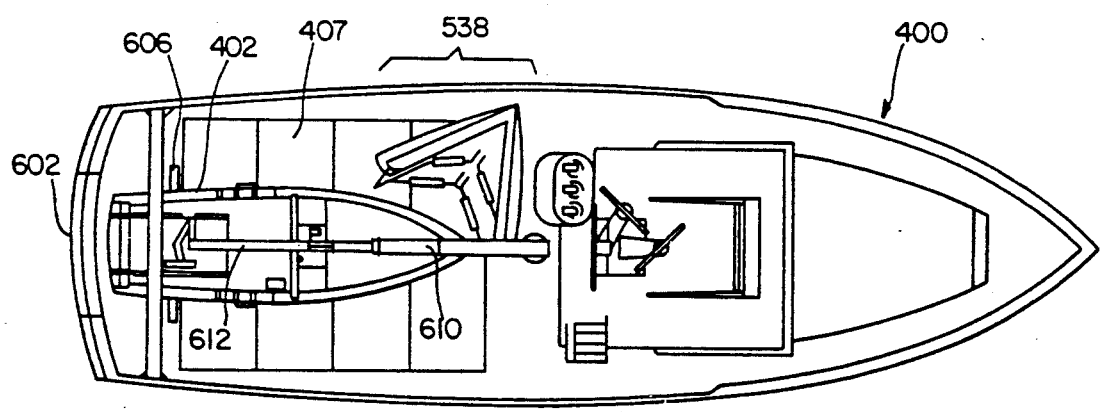

As introduced above, a main advantage of the present invention is its ability to arrive at the scene of an oil spill rapidly, and contain it in an expedited manner. FIGS. 6A and 6B illustrates the carrier vessel 400 with the tender vessel 402 mounted on its afterdeck. In a preferred embodiment, the carrier is 70 feet in length with three 500–700-horsepower engines and the tender is 25 feet in length with a 150-horsepower engine. These sizes are believed optimum for quickly arriving at the scene of an oil spill, and rapidly deploying a significant length of boom. This in contrast to known systems, in which larger ships are necessary to carry booms which are greater in bulk and therefore more difficult to deploy than the boom sections according to the present invention. A larger boat might take a longer time to arrive at the scene of a spill, whereas a smaller boat might be able to carry a length of boom which would be insufficient to surround and contain an adequate amount of the oil spill.

There are at least two reasons for employing three engines instead of one or two of much more horsepower. One large engine of equivalent horsepower would push the boat too fast for easy handling at low speed due to the size and pitch of the propeller required to utilize this power at high speed. The same principle applies to only two engines, but use of three engines allows the two outboard engines to be shut down while deploying boom unless needed. This effectively loads the center engine, allowing a lower slow speed while leaving plenty of power for maneuvering. Due to its location directly ahead of the rudder, this engine steers the boat better. Another advantage of using three engines is, of course, an increase in dependability of the boat; effectively, two "backup" engines are present, allowing the boat to continue its task even in the event of double engine failure.

Referring again to FIGS. 6A and 6B, a carrier vessel 400 is illustrated with a tender vessel 402 mounted on its afterdeck atop a hatch cover 407 which covers the carrier's hold. According to the present invention, the tender 402 is advantageously capable of being mounted and dismounted from the carrier's afterdeck with the assistance of hydraulic crane 410. Upon arrival at the oil spill, a section of transom 602 (FIGS. 6A and 6B) on the aft end of the carrier is taken out. Flanged rollers 604 and 606 allow the tender vessel to roll backward off the deck of the carrier, the tender keel resting in a 3½×6 inch aluminum channel and on roller 606. In unloading the tender, the inner section 610 of crane 410 is brought to its most vertical position, and the crane's outer section 612 is positioned over the forward end of tender. A winch cable is connected to a ring on the forward deck of the tender. A snub line is connected to the bow of the tender via a small winch located on the inner section of the crane. The bow of the tender is lifted just enough to transfer weight from the channel to the flanged roller 606. The tender starts to roll back but is held by the snub line and supported by the winch cable and adjustable rollers located adjacent to roller 606. As the tender rolls back, a balance point is reached where it can be guided onto roller 604, allowing it to roll into the water. Once the tender's stern is afloat, the winch cable keeps the tender upright. The motor, a worm gear coupled to the motor, the cable, and sheaves for guiding the cable by the end of the crane are described below, with special reference to FIGS. 10A and 8B.

In this manner, the tender may be fully prepared for its duties in deploying the boom as it is unwound from the reels in the hold of the carrier vessel. For example, the towing posts (to be described below) may be deployed on the side of the tender vessel after it is placed in the water.

To retrieve the tender and place it aboard the carrier deck is substantially the same operation, but in reverse order.

A control station 620 is provided to allow a single person to control the various functions of the crane and A-frame. The control stations's location forward of the hold allows an operator a clear view of the operations of the crane and A-frame. These functions will be described in greater detail below. For example, brake 944 (FIG. 9A), motor 915, and the hydraulic motor for gear box 990 are all advantageously controlled at this central location.

Figure 7A:
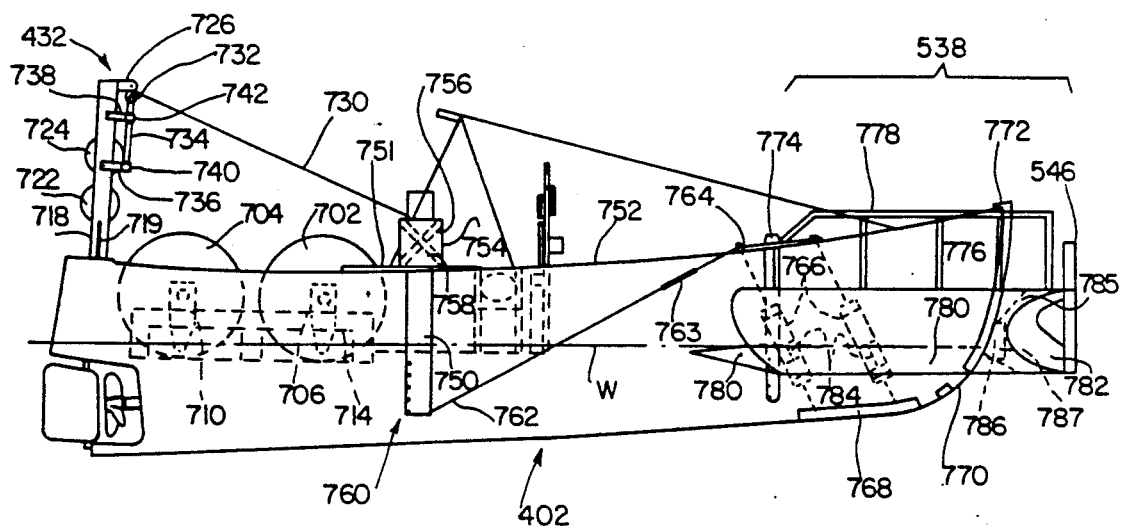
FIGS. 7A and 7B are side and top views, respectively, of a preferred embodiment of the tender vessel according to the present invention.
Figure 7B:
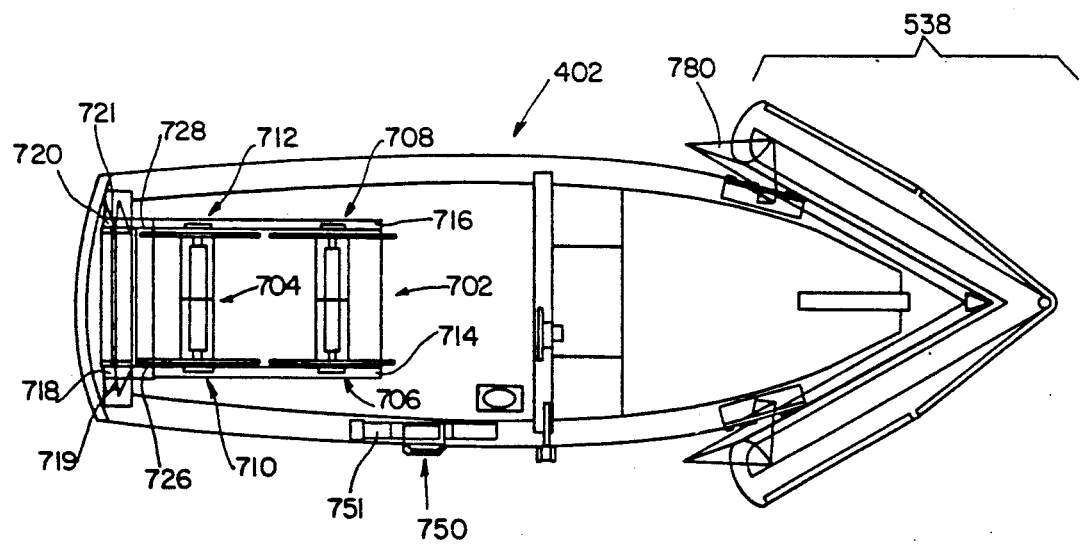

FIGS. 7A and 7B are side and top views, respectively, of a preferred embodiment of the tender vessel according to the present invention.

FIGS. 7A and 7B illustrate fore and aft reels 702, 704 in the hold of the tender. Reels 702 and 704 are mounted in the hold of the tender by means of reel mounts 706/708 and 710/712, respectively. Reel mounts 706, 708, 710, 712 are inserted in reel bearing anchors 714, 716, respectively. The bearing mounts and the reel bearing anchors are described in greater detail below, with respect to FIGS. 11A, 11B, and 11C.

Tender 402 is provided with a tender A-frame 432 used to deploy reels of boom. The A-frame is tilted forward slightly to a position rollers 722 and 724 ahead of the rudder to make it easier to steer the boat.

Tender A-frame 432 has two vertical members 718, 720. These support members may be 3.5×10 inch aluminum channels laterally supported by brace members 719, 721, respectively. Traversing the lateral distance between the vertical members are lower roller 722 and upper roller 724. Rollers 722 and 724 are horizontally oriented rollers whose axes penetrate vertical members 718, 720. The rollers may be 5-inch schedule 40 pipe covered with neoprene.

Pulley support arms 726, 728 project outwardly from vertical members 718, 720, respectively. The pulley support arms each support a pulley 732 on which is wound a cable 730. Hanging downward from pulley 732, cable 730 supports swing arm alignment member 734 along with a second swing arm alignment member (not visible behind 734 in FIG. 7A). Lower swing arm 736 and upper swing arm 738 extend from the swing arm alignment member 734 to respective vertical support members 718, 720. The two ends of each swing arm are rotatably attached at one end to the vertical support members, and to the swing arm alignment members at the other end.

Squeeze rollers 740, 742 extend between the opposite swing arm alignment members, and are axially attached thereto to allow free rotation.

In operation, the degree to which cable 730 allows swing arm alignment member 734 to move substantially downwardly under the force of gravity (guided by the rotating swing arms 736, 738), determines how closely squeeze rollers 740, 742 approach lower and upper rollers 722, 724. This arrangement allows a length of boom to be deployed from one or both of reels 702, 704 over upper and/or lower rollers 722 or 724. The purpose of allowing squeeze rollers 740, 742 to compress the boom as it is deployed is to stop the air from flowing into the un-deployed ends of the boom chambers while the valves are being inserted; in contrast to the carrier, the envisioned tender does not have the required height to allow the weight of the boom to accomplish this.

Use of two rollers 722, 724 is desired for simultaneous deployment of two boom sections in, for example, an oil spill splitting scenario. When the tender is making a split one boom length long, it uses its own two reels instead of those from the carrier. The tender generally only deploys boom sections, and does not retrieve them as efficiently as the illustrated carrier vessel.

In certain circumstances, the tender may need to deploy a boom section; usually, this need arises in shallow water where the carrier cannot go. The tender's deployment of boom sections is valuable near rocky shores, or beaches where the oil has reached the shore. For example, at high tide, a light weight hose is run out ahead to the shore or in a flat bottomed boat; with a high volume of low pressure air from a centrifugal blower, the oil is moved out away from shore so the tender can get inside of it, deploying a boom between the spill and shore. The boom containing the spill is then moved to deep water and anchored. The blower for inflating the boom sections under these conditions may be in a small boat or raft.

Returning to discussion of FIG. 7A, the free end of cable 730 may advantageously be attached to a towing post holder 754 which holds a towing post 750. In practice, two lines 730 may be used, one extending from each alignment member to the same towing post holder. The towing post holder 754 has crossmembers 756, 758 to provide stability. The holder is mounted on a towing post bracket 751 which is bolted to the tender's washboard 752.

Towing post 750 is a substantially rectangular sheet of metal, with its longer dimension oriented vertically. It is advantageously bolted to the washboards 752 of the tender via the holder 754 and bracket 751; plural holes may be provided to allow the towing post to be vertically adjustable. Vertical adjustability is needed, for example, to allow attachment to boats of different sizes. Posts are lifted up to hook them to the boom sections, and lowered to tow them through the water.

A plurality of holes 760 are provided near the bottom of aft edge of the towing post. The holes are for receiving a corresponding plurality of cables which may in turn be attached to the fastening means 114 (FIG. 1B) of the cable section.

Although only one towing post 750 is illustrated as attached, it is understood that a second towing post may also be attached, on the opposite side of the tender. Attachment of two towing posts is advantageous in the event that two booms must be deployed, such as in the oil spill splitting scenario illustrated in FIG. 5.

Advantageously, these holders may be bolted to the washboard of any lobster-type boat. Several boats may be used when towing areas of boom because they keep the boom stretched to its full size. The towing post's main function is to tow without lifting the boom.

Stability is provided the towing posts by a cable 762 which extends forwardly and upwardly via a turnbuckle 763 to forward towing post bracket 764. Bracket 764 is connected through one or more belts such as 766 (e.g., 0.5×6 inch) which conform to the side of the boat, finally to an aluminum channel 768 (e.g., 3.5×6 inch) shaped to fit the tender's keel. Channel 768 is connected via a nylon strap 770 to an aluminum piece (e.g., ¼-inch) shaped to fit the stem piece 772 on the tender's bow. This assembly is flexible so the splitter can sit flat when stored.

A forward towing post 774 is attached to forward towing post bracket 764. Forward towing post 774 is used for towing side booms 540, 542 (FIG. 5), and may be vertically adjustable in the same manner as towing post 750.

Also illustrated in FIGS. 7A and FIG. 7B is the detailed structure of splitter 538. Splitter 538 includes a sponson 780. Sponson 780 is on the back side of a rolled V-shaped blade, the sponson having arms of a "V" which are substantially triangular in cross section, occupying approximately one-third of the vertical height of the back of the blade. The sponson itself is (when viewed from above) a V-shaped air chamber that gives the splitter positive buoyancy. The main advantage of sponsons is flotation; but due to their shape and location on the back sides of the splitter blades, less drag is created as the splitter is pushed through the water.

The blades of the splitter are essentially V-shaped and oriented like a snow plow, having concave aluminum outer faces of (for example) 13-inch radius and 3/16-inch thickness. The forward end of the blades are welded to a flat 5/16-inch thick center cutting edge 782. The cutting edge has a sharpened front edge for splitting the water as the vessel moves forward. Cutting edge 782 is preferably a metal piece (e.g., aluminum) which enables the splitter to work in heavy crude and bunker type oil, especially in winter. The sponson and tread plate may be 3/16-inch aluminum.

A holder mechanism (not shown) may be provided which allows the sponson to be attached to the forward towing post.

Straps 766 are 0.5"×6" conveyor belting with end pieces riveted to their ends, to which the chain is connected. Bottom chains extend downward from the belting and are shackled to channel 768, and top chains extend upward to the forward towing post bracket 764.

Forward and aft aluminum T's 784 are riveted to each strap, with the cross of each "T" contacting a belting and the stem of the "T" extending outward in an outboard direction. A piece welded low on the sponson is lined up with the after "T". Between the sponson piece and the after "T" is a mating piece of aluminum flat bar with slots on each end for adjustable attachment of the tender and splitter. Similarly, a mating piece is welded higher on the splitter blade than on the sponson, also with an adjustable connecting bar for connecting the blade to the forward T. The aft strap's "T" is located at a higher position on the strap than is the forward strap's "T". This relative placement arrangement provides a bracing effect. These adjustable connectors are fitted to the tender while it is out of the water so no adjustment will be necessary when it is used.

In this manner, one of the straps connects the sponson to the boat; the other connects the splitter blade to the boat. The splitter is also connected to the boat in front of the stem piece 772, in the following manner. A vertical planar stem piece extension 787 extends forward from the stem piece 772 at approximately water level. It is bolted at point 786 to a vertical planar splitter stabilizing piece 785 which extends rearwardly from the inner corner of the splitter blade's "V". Such a bolt allows a slight pivoting of the splitter for positioning during installation, before it is tightened.

The lower end of the forward towing post 774 may be attached in the following manner. A hinged latch is provided on the sponson to hold the bottom of the forward towing post snugly against it. The hinged latch includes a substantially horizontally oriented lower "U" shaped piece and an elongated upper piece. The "U" is part of a ⅜-inch plate welded to the bottom of the sponson. The upper piece is an elongated member pivoting on a 0.5-inch pivot bolt penetrating its first end and the first leg of the "U" near its tip. The upper piece may be manually rotated away from the "U" to allow the towing post to be placed inside the "U". The upper piece is then rotated back so that its second end joins the tip of the second leg of the "U" to bridge the interior of the "U", securing the towing post. A 0.5-inch vertical pin is placed from above through matching holes in the second end of the upper piece and the second leg of the "U", holding the latch in the closed position. This arrangement for securing the towing post to the sponson is advantageous because it allows boom sections to be attached to the towing post before it is placed into position. Three lower holes of the towing post are below where it is latched, otherwise making it difficult to attach boom sections to the towing post after it is in position.

Atop the splitter assembly, a handrail 778 is provided for safety to allow men to stand on a tread plate 776 to make boom connections.

To attach the splitter to the tender, the carrier puts the splitter over the side with crane. The forward end of the splitter floats lower, with aft end slightly higher, than when attached to the tender. When the tender enters into the splitter's "V", it is pushed down so the keel can enter the channel 768; then, the forward end of the splitter is lifted and placed over the stem of the tender. Chains are then connected to the towing post brackets 764 and tightened with binders. The straps and hangers are slanted back to make it more secure; this is especially desirable when the tender is moving backward. The splitter is advantageously fitted to the tender before use so that no adjustment is necessary in the water.

Figure 8A:
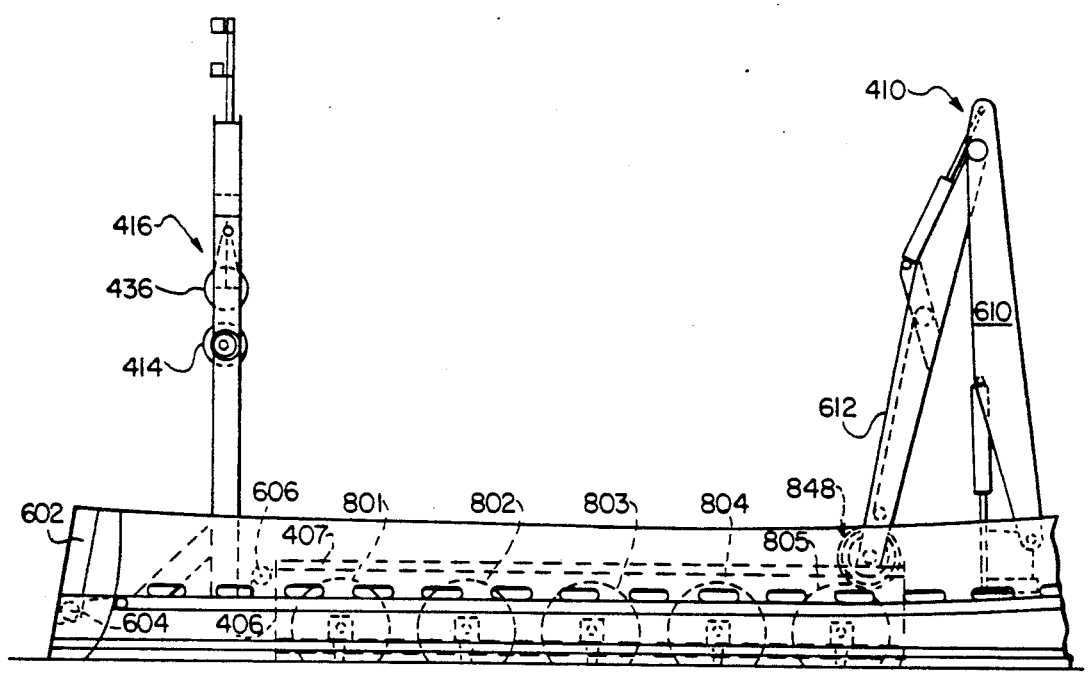
FIGS. 8A is a partial cutaway side view.
Figure 8C:
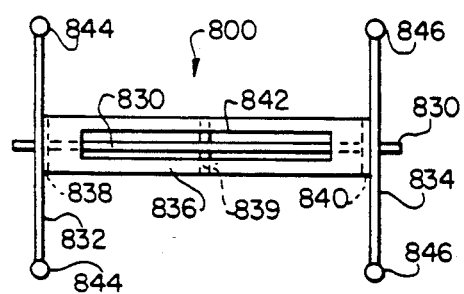
FIG. 8C illustrates a preferred reel for storing boom sections.
Figure 8B:
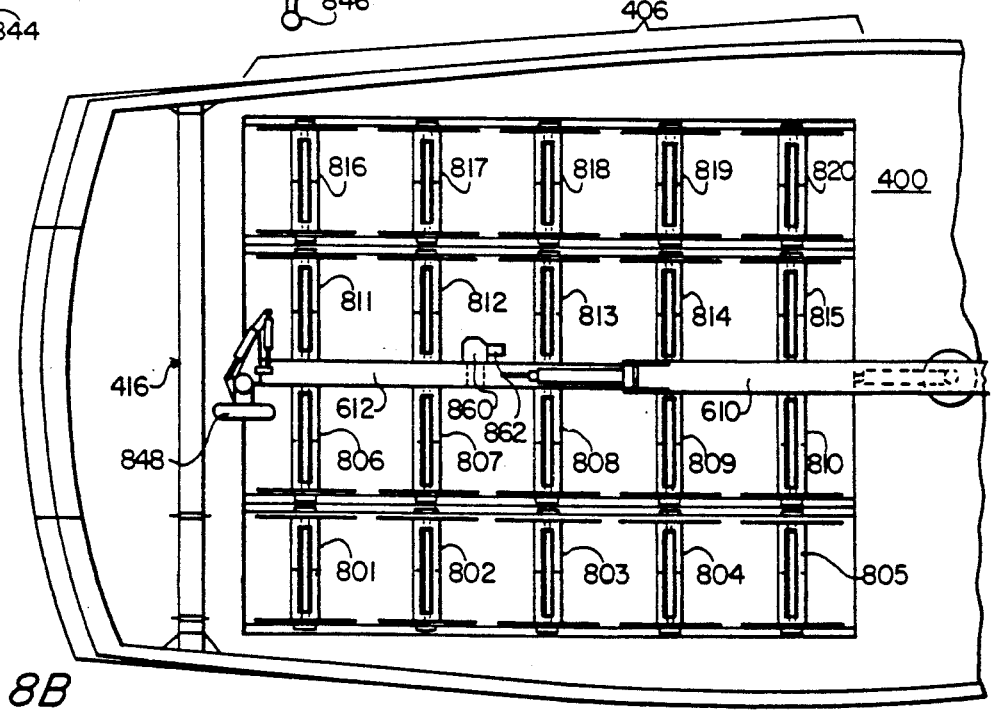
FIG. 8B is a top view, of the hold of the carrier vessel according to a preferred embodiment.

FIGS. 8A and 8B are respective cutaway side and top views, respectively, of the hold of the carrier vessel 400 according to a preferred embodiment. Hold 406 contains twenty reels 801-820. Each reel is adapted to hold a 500-foot long boom section. Advantageously, the axes of the reels are oriented transversely in the carrier's hold, allowing the boom sections to be unwound toward A-frame 416.

In the illustrated embodiment, the axes of reels 801, 806, 811, and 816 are arranged in a linear fashion so as to form an aft row of reels. Similarly, the axes of reel 802, 807, 812, and 817 are arranged linearly with one another, and parallel to the axes of reels 801, 806, 811 and 816. Reels 803, 808, 813, 818; 804, 809, 814, 819; and 805, 810, 815, 820 are similarly arranged. In this manner, a compact but readily accessible array of boom section reels is available for deployment. In the illustrated embodiment, twenty reels, each containing a 500 foot-length of boom section, provides 10,000 feet (or nearly 2 miles) of boom. If arranged in a circle, this length of boom would surround an area of approximately 0.285 square miles.

A carrier having 10,000 feet of boom would be capable of containing an estimated 11,625,000 gallons of oil if the spill is three inches thick. However, if this spill is not immediately contained, and were allowed to spread to a thickness of only 0.125", it would cover an area of about 5.5 square miles. Furthermore, a heavy layer of oil reduces wave action offering less wind resistance on the surface, thereby making it easier for the water to flow underneath the boom due to the natural tendency for undisturbed water and oil not to mix. Also, less flotsam would be present in the oil if contained earlier, which would make it easier for skimmers to pick up the oil; use might be made of the spilled oil rather than simply incinerating it.

Clearly, these figures indicate the advantage of rapidly containing an oil spill. The present system is designed to prevent spread of an oil spill by arriving on site quickly with a self-contained unit capable of quickly deploying a substantial length of oil boom with a minimum of manual labor.

Referring now to FIG. 8C, a typical reel 800 is illustrated in cross-section. The reel includes a shaft 830 which extends laterally through two end disks 832, 834. A drum 836 is securely affixed to the shaft 830 and the disks 832, 834 by inner disks 838, 840. This arrangement provides a hollow inner space within drum 836 which is not occupied by shaft 830; this space is provided for the end of a boom section which is wound around it. A center disk 839 is also provided to fit the bottom half of shaft 830. The center disk is shaped to match a slot 842 on the drum. This center disk 839 provides stiff support between shaft 830 and drum 836.

Drum 836 is provided with a longitudinal slot 842 occupying approximately 53-54 circumferential degrees. The slot runs lengthwise on the drum, and may be 4.75 inches wide and 2 feet, 10 inches long. The slot's edges are rounded with a 0.375 radius to prevent damage to the boom material. The preferred drum is 42 inches long, approximately 6 inches more than the width of the boom when flattened out. This extra width is provided so that there is room to alternate the boom section back and forth along the drum while rewinding, to prevent the boom's lead line from piling up in one place. This feature is accomplished by movement of a traveler drum 970 FIG. 9A (below).

The disks 832, 834 are provided with rims 844, 846 at their respective peripheries. Disks 832 and 834 are substantially circular disks of thickness 0.25 inches. Rims 844, 846 are ⅜-inch round aluminum rod rolled in a circle and welded to the periphery of the disks 832, 834. They provide a widened surface area at the periphery of the respective disks for a drive wheel 848 on the hydraulic crane 410 to turn the reel. The drive wheel 848 contacts either rim, allowing rotational force to be applied to the reel.

In addition to providing a surface area of the wheel 848, the rims 844, 846 may also serve as a secure gripping area for self locking clamps that are fastened to a spreader bar used to lift loaded reels of boom. Such clamps are spring-loaded, and are snapped down over the rims; when strain is taken, they lock over the edges with a scissor action.

Reels 800 may be fabricated of the following components and sizes. Drum 836 may be 6351-T6 aluminum schedule 40 pipe with outside diameter 10.75 inches, and wall thickness 0.365 inches. Disks 832, 834 may be 6061-T651 aluminum with 0.25-inch thickness and 39-inch diameter. Inner disks may be 6061-T651 aluminum, 0.375 inch thick with a 10.02-inch diameter. Rims 844, 846 may be 6061-T6 aluminum rods with 0.75-inch diameter. Shaft 830 may be 6351-T6 aluminum schedule 80, 2.5-inch pipe with an outside diameter of 2.875 inches and a wall thickness 0.276 inch.

The boom sections are stored on reels in the following manner.

Referring briefly to FIG. 1B, it is assumed that the end of the boom section having third and forth valve assemblies 162, 164 is placed on the reel first. To allow the boom section to fit snugly and smoothly on the drum 836 (FIG. 8C), third and forth valve assemblies 162, 164 are removed before winding the boom section onto it. The end of the boom section is inserted into slot 842 in the drum 836 to a length at least exceeding that defined by end cover 252 (FIG. 2D) to prevent damage to it. Then, the remaining length of the boom section is snugly wound around the drum 836, with rotational force advantageously applied by drive wheel 848 against rims 844, 846. As the boom section is almost completely wound around the reel drum, first and second valve assemblies 158, 160 need not be removed. These remaining valve assemblies may be left affixed to the boom section, to allow the boom to be deployed again as rapidly as possible.

Deployment of a boom may be performed as follows.

First, one of the twenty reels 801-820 containing boom sections is chosen from the carrier hold (FIGS. 8A, 8B) as a "first" boom section. A first end of the first boom section (presumably having valve assemblies installed) is lifted (e.g., manually) over lower roller 414 on A-frame 416. The first end of the boom section is handed to crew members on the tender who immediately connect air hoses from a blower. This blower is advantageously equipped with a dumping valve or waste gate so that inflation can be controlled. The boom is tied with just one line to the tender or held manually for this operation to save time. A polyball and anchor (FIG. 5) are attached to the first end of the first boom section in this time frame.

The previous description shows a "normal" method of deployment, envisioned for use in deep water in which the carrier vessel can move freely. In cases of shoal water deployment where connecting tubes are used between consecutive boom sections, the boom is towed by the towing post; anchors are not set until the boom is in location.

Returning to discussion of the "normal" mode of deployment, one of the two vessels (preferably the carrier vessel) moves away from the other. The reel containing the first boom section is caused to unwind by the relative motion of the two vessels. As the end of unwinding the 500-foot boom section nears completion, the moving vessel stops its motion with respect to the other. At this time, the second end of the first boom section is removed from the slot 842 in the reel's drum 836. Third and fourth valve assemblies may be inserted into the openings provided for them in the end cover of the boom section. At this time, the tender crew disconnects the air hoses, and uses neoprene caps 161 (FIG. 1C) to cover the valve assemblies if weather dictates.

In a preferred boom section, the inflatable chambers may receive valve assemblies at both their first and second ends, allowing inflation from either the carrier or tender. It also allows serial connection of the inflatable chambers of successively deployed boom sections so that more than one boom section can be inflated at a time. Attachment and inflation of successive boom sections is now described.

A second reel containing a second boom section is chosen from those remaining in the hold. A first fastening means 114 (FIG. 1B) of the second boom section is attached to the second fastening means 116 of the first boom section. Also, a spacer float 190 (FIG. 1C) is attached to the fastening means by a ring 192 (also in FIG. 1C). A seal 226 is attached to the second end of the first boom section and to the first end of the second boom section, thereby providing a fluid-tight seal to at least the depth of oil expected and over the top of the boom section.

The second end of the first boom section and the first end of the second boom section to which it is connected, are lifted over the first roller 414. In a manner similar to deployment of the first section, one of the two vessels travels away from the other, causing the second reel to unwind its boom section.

In this manner, boom sections are successively attached end-to-end, to deploy a boom of substantial length in a very short period of time.

As will readily be appreciated by those skilled in the art, it is desired that the boom section no sink as it is being deployed. To this end, a blower is provided on the tender vessel to partially inflate the boom section during the deployment process; another blower may be present on the carrier for inflating boom sections when being deployed from reels on the tender. Each boom section may be fully inflated after it is fully deployed, as it is no longer on the reel.

The exact manner in which the succeeding boom sections are inflated varies according to whether a connecting tube such as element 188 (FIG. 1C) is employed. If a connecting tube is not employed, then each section may be inflated by the tender (or the carrier, or both) as soon as it is deployed. Alternatively, if a connecting tube is employed between succeeding boom sections, then a plurality of succeeding boom sections may be simultaneously inflated. After the plurality of boom sections are simultaneously inflated, the connecting tube may be removed so that the chambers from succeeding boom sections become floatable independently of one another. This independence allows a chamber in a single boom section to suffer deflation (for example, through leak or puncture) without other adjacent boom sections being affected. In this manner, the overall integrity of the boom is preserved.

As will be appreciated by those skilled in the art, the unrolling of the boom sections from the reels occurs naturally, as a result of the relative motion of the carrier and the tender vessels. Thus, it is only at the times when one boom section needs to be attached to a succeeding boom section, that manual intervention is necessary. The hydraulic crane 410 with its drive wheel 848 may be necessary to control the rate at which a reel unwinds. A slight tension is maintained in the boom to control its rate of deployment, to prevent potentially damaging impulses from damaging the flotation chambers or curtain.

The drive wheel 848 is lined up with and close to the rims of the reel in question, so that contact is easy if needed to slow the reel. The carrier stops while the valves are being inserted and connection to the next section of boom is being made. Upon signal that the valves are properly inserted, the tender crew brings the boom up to full pressure and releases the air hoses. The tender then runs ahead to the carrier to be in position to begin deployment of a subsequent boom section from a next reel. The run from one end of the deployed boom section to the other takes about one minute.

Ordinarily, anchors are initially set every 500 feet. Any reinforced section of the boom which is at 50-foot intervals can be used for anchoring. By using nylon monofilament for a frame, the boom chambers and curtain are protected from the strain of towing and anchoring.

As described in greater detail below, upper roller 436 is provided to retrieve the boom section, presumably after the oil spill has been contained. During the retrieval operation, hydraulic crane 410 and drive wheel 848 are used to provide rotational motion to the destination reel. Upper roller 436 is disposed approximately 13 feet above the water. This height above the water allows the boom to be reeled in while simultaneously squeezing the air out of the boom's inflatable chambers. Squeezing the air out of the chambers is accomplished by the weight of the boom section as it hangs down to the water aft of the A-frame and the weight of the boom section as it hangs down forward, toward the hold.

While the boom is being reeled back in, the tender crew keeps the valves depressed (in their open position) to allow air to escape from the chambers. The carrier preferably moves backward towards the boom for this retrieval operation; with three propellers it has very good steerage ability while moving backward.

A minimum crew required for initial deployment of a boom would be about three trained men, and two or three untrained assistants. The simplicity of the present system would make it easy to train additional personnel.

The trained personnel serve the functions of captain and two or three mates. They should be able to handle all functions on both the carrier and tender and understand after viewing the situation how to deploy the boom to keep the spill under control and as small as possible. They should also be familiar with radar, loran and compass to enable them to run in fog and at night.

The untrained assistants serve the functions of handling the booms and connecting them, inserting valves, placing valve seals, setting anchors, inflating booms and carrying out any other duties that would be expected of a helper.

The present system is especially useful when members of the local fishing or marine community are needed to assist in containing an oil spill. The small number of trained personnel required allows these local fishermen or marine personnel to serve as the untrained assistants, as necessary. Such individuals may also provide valuable assistance, due to their greater knowledge of the locality of special problems in navigating boats in it.

FIGS. 9A and 9B illustrate in forward-looking and starboard side views, respectively, a preferred embodiment of the carrier vessel's A-frame 416. A-frame 416 has been illustrated and described briefly above with respect to FIGS. 4, 5, 6, 8A, and 8B. Tender A-frame 432 (described with respect to FIG. 7A) is in certain respects similar to carrier A-frame 416: both tender rollers function in substantially the same manner as the carrier's idler roller 912, except that a braking function is performed by pipe welded to the swing-arms of the tender. Tender A-frame 432 is well adapted only to deploy boom sections; however, carrier A-frame 416 provides for both deployment and retrieval of boom sections.

Referring again to FIGS. 9A and 9B, the carrier's A-frame has first and second vertical support members 902, 904, which are joined at their top ends by a top member 906 by respective elbow members 908, 910. Top member 906 comprises the non-parallel sides and the shorter of the two parallel sides, of a regular trapezoid. A brace 903 joins each vertical support member to carrier's deck at an angle of approximately 45 degrees, for added stability.

Several other elements extend between support members 902 and 904.

A lowermost of these elements is idler roller 912. Above idler roller 912 and parallel to it is upper roller 914. Idler roller 912 and upper roller 914 are adapted to rotate about parallel axes having respective first ends 916, 918 inserted into first vertical support 904 through respective flange block bearings 920, 922. Opposite ends of the axes of idler roller 912 and upper roller 914 penetrate second vertical support member 902, through respective flange block bearings 924, 926.

As described above, with respect to FIG. 4, idler roller 912 is used for deployment of boom sections from the hold of the carrier, whereas upper roller 914 is used for retrieving boom sections. The structure and operation of each are now described in greater detail.

Referring specifically to the construction of idler roller 912, an idler roller drum 928 extends between opposite disk-shaped ends 930, 932. To provide support for the drum extending between the support members 902, 904, drum support structures are provided at each end of the drum. A drum support structure at the left end of the drum will be described in detail, with the understanding that a similar structure is employed at the opposite end.

Axis 934 extends from its end 916 in first vertical support member 904 through flange block bearing 920 and disk 930, to penetrate the interior of drum 928. Within drum 928 are provided two parallel, circular, co-axial inner rings 936, 938. Axis 934 projects through the center of inner rings 936, 938. Inner ring 936 is immediately adjacent disk 930, whereas inner ring 938 is disposed a suitable distance away from it, such as 15% of the length of the drum 928. Advantageously, the distance spanned by axis 934 between disks 936 and 938 provides support to the center section of drum 928. Such reinforcement is needed to support the drum, as it is designed to support lengths of oil boom sections as they are being deployed. Inner rings 936, 938 fit snugly within the interior of drum 928 and are plug welded: holes are drilled in the drum at the position of the inner rings, and after they are pressed in place the holes are filled with weld, thus securing the rings. All the inner rings in FIGS. 9A, 9B may be installed in this manner.

At the opposite end of idler roller 912 from axis 934 is a second axis 940, which operates in conjunction with inner rings 942, 943 in a manner similar to that described with inner rings 936, 938. However, axis 940 extends through bearings 924 and vertical support member 902 to a brake 944. Brake 944 is provided to control the deployment of boom sections, as the normal mode of deploying boom sections is to allow the relative motion of the carrier vessel and the tender vessel to pull the boom section over the roller. Brake 944 allows stabilization of the boom section for such manual operation as insertion and removal of valve assemblies, and connection of consecutively deployed boom sections. Brake 944 is preferably controlled from the control station 620 (FIG. 6A).

Upper roller 914 is supported in a manner similar to idler roller 912. Specifically, axes projecting from vertical support members 902, 904 via flange block bearings penetrate the interior of upper roller 914, the axes penetrating the center of respective pairs of inner rings spaced to provide support for the drum. Upper roller 914 rotates under control of a chain and sprocket, powered by hydraulic motor 915 which is attached to vertical support member 902. The chain and sprocket drive includes a first chain sprocket 917 attached to a shaft of the hydraulic motor 915, and a second chain sprocket 919 attached near the end of the shaft of upper roller 914. Motor 915 is preferably controlled from the control station 610 (FIG. 6A).

To assist in the retrieval of boom sections, and to assist in the guidance of retrieved boom sections for snug rewinding onto reels, a traveler assembly, generally indicated as element 960, is provided. Briefly, traveler assembly 960 is controlled to slide along a carrier rod 962, which extends horizontally between vertical support members, 902, 904 at a position above upper roller 914. Traveler assembly 960 includes a cylinder 964 with chain grip 996, traveler yoke members 966, 968, and yoke side braces 976, 978, 980, 982. The traveler assembly's yoke moves a drum 970 with outer disks 972, 974 longitudinally along upper roller 914. These elements are now described in greater detail.

Traveler assembly 960 includes a horizontally oriented hollow cylinder 964. Rod 962 extends between vertical support members 902, 904, and is adapted to fit loosely in the cylinder's hollow interior. Extending downward from near the two ends of cylinder 964 are the traveler yoke members 966, 968. Yoke members 966, 968 extend perpendicular to the cylinder's axis to contact respective 0.5-inch Teflon thrust washers 967, 969; the thrust washers are disposed between the yoke members and the outer disks 972, 974 to act as bearings between the disks and yoke members. As the traveler assembly moves longitudinally, the yoke members contact the thrust washers 967, 969, which in turn contact the drum's outer disks 972, 974, causing the drum 970 to move longitudinally.

Even as drum 970 moves longitudinally, it may rotate about its axis. Upper roller 914 has ⅜×182 inch keys (projections) welded 180° apart which are received by keyways (slots) machined into the inner surface axial openings of end disks 972, 974. This key arrangement makes drum 970 rotate with upper roller 914.

Each of end disk 972, 974 have inner and outer shoulders (not visible in FIG. 9A). These shoulders are essentially disks of smaller diameter which are concentrically arranged with the large-diameter center portion of the disks 972, 974; the thickness and diameter of these shoulders are chosen as follows.

On the inner surfaces of traveler end disks 972, 974 are 2-inch-thick inner shoulders which are machined to fit loosely over upper roller 914 and its projecting keys. The drum can be moved the length of roller 914 but has to rotate with it, due to the interlocking action of keys and keyways. Inner shoulders provide an additional thickness to the disks so that the keyways are longer, longitudinally; this thickness causes the keyways to deform or wear away less.

The outer shoulders on the end disks fit within the inner diameter of the thrust washers 967, 969 to keep them centered. The optimal thickness of the outer shoulder, 0.375 inch, is chosen to be less than the 0.5-inch thickness of the teflon thrust washers; the outer shoulder does not contact yoke members 966, 968.

As illustrated most clearly in FIG. 9B, yoke members 966, 968 are essentially rounded triangular forms, fork-like in shape with prongs pointed downward and surrounding upper roller 914. The yoke members contain between them the drum 970, drum end disks 972, 974, and thrust washers 967, 969. The yoke members do not rest on any portion of the drum or upper roller; rather, they are supported by rod 962 via cylinder 964 to enclose the drum 970 outside its outer disks 972, 974 and thrust washers 967, 969, contacting only the thrust washers.

Referring again to the traveller assembly 960, yoke members 966, 968 are reinforced by inner yoke braces 976, 978. Inner yoke braces 976, 978 have flat metal portions oriented perpendicular to the yoke members 966, 968 and parallel to the longitudinal direction of cylinder 964, and connected thereto as the lower surface thereof. Inner yoke braces 976, 978 are supplemented by outer yoke braces 980, 982 which are planar extensions of respective yoke inner side braces 976, 978 on opposite sides of respective yoke members 966, 968.

The position and motion of the traveler assembly 960 is determined by a gear box 990 operating with a sprocket 992, having teeth which engage an endless chain 994. Chain 994 extends from the sprocket 992 down to the chain grip 996 attached to the top surface of traveler assembly 964. From the chain grip 996, the chain 994 extends to a sprocket idler 998 mounted on a bracket affixed to first vertical support member 904. From sprocket idler 998, chain 994 extends horizontally back to sprocket 992 to constitute the endless chain.

In operation, a hydraulic motor (not pictured) working through gear box 990 causes sprocket 992 to rotate, thereby causing chain 994 to displace the traveler assembly 960 by virtue of the chain's fixed connection to the traveler assembly at chain grip 996. The hydraulic motor for gear box 990 is preferably controlled from the control station 620 (FIG. 6A).

Traveler drum 970 is hollow, allowing it to slide longitudinally along upper roller 914 to a position determined by the position of traveler assembly 960. In this manner, rotation of sprocket 992 may position traveler assembly 960 and drum 970 at any point along carrier rod 962. In practice, the position of the traveler assembly 960 is chosen to be directly behind a reel in the hold of the carrier (see FIGS. 8A and 8B), thus allowing there to be no twist in the boom section as it is rewound back onto the reel. Roller 970 and motor 915 do more than half of the work during boom retrieval, with drive wheel on the crane doing the rest.

Lower roller 912 is an idler roller, meaning that the boom's motion over it causes it to rotate. The brake 944 holds the boom in place atop the lower roller while valves are being put in, or any other time the deployment process should be delayed. Upper roller 914 does not need a brake because it is driven by the hydraulic motor 915: designed so that it cannot be rotated in neutral, the motor acts as a brake when not being rotated by hydraulic pressure.

Affirmative rotation of the traveler drum supplies most of the force during boom retrieval, with the crane drive wheel keeping the right amount of tension for smoothly winding of the boom without making it too tight. Each successive turn the traveler drum passes a constant length of boom per revolution; this means that either the drive wheel has to keep slowing down or the traveler speed has to increase as retrieval of a boom section progresses. Advantageously, separate hydraulic controls on both the traveller drum and the crane's drive wheel provide the operator with total control of the retrieval process.

Specific construction of the components on the A-frame 416 may be as follows.

Vertical support members 902, 904, top member 906, and elbows 908, 910 may be constructed of 3.5×10 inch aluminum channel, formed in the shape of a "C" for added strength with minimal weight. The idler roller 912 may be made of 0.125-inch neoprene bonded to 8-inch schedule 80 aluminum pipe. The shafts such as 934 may be 2.5-inch stainless steel, and the inner ring such as 936, 938, may be manufactured of 2-inch thick aluminum. Brake 944 may be a drum or disk-type brake, such as model number T20 (disc type), from Hilliard Corp. of 100 West Fourth Street, Elmira, N.Y. 14901.

Upper roller 914 may be constructed in a manner similar to idler roller 912, except that it is not neoprene covered and it has longitudinal keys welded to either side. Drum assembly 970, 972, 974 may be constructed of 6351-T6 aluminum. The drum assembly's shaft is 2.5 inch stainless steel keyed to its inner rings. The inner rings may be 2 inches thick, and plug welded to upper roller 914 in a manner described above, with respect to inner rings 936, 938. Upper roller 914 may be 4.5 inch schedule 80 pipe. Drum 970 may itself be 10-inch schedule 40 aluminum which is welded to 0.25 inch thick, 17 inch diameter end disks 972, 974; the outer surface of the drum is advantageously bonded with 0.125 inch neoprene, to enhance the gripping ability of the drum on the boom sections. The outer shoulder is 0.375 inch thick, 5 inch inside diameter, 7 inch outside diameter ring; the inner shoulder has the same diameter but 2 inch thickness. The teflon thrust washers have 7 inch inside diameters and 10 inch outside diameters. It is understood that these dimensions are rounded, and that appropriate clearances may be chosen by those skilled in the art.

The cylinder, side braces, and yoke members of the traveler assembly may be constructed of 6351-T6 aluminum.

Carrier rod 962 may be 2.5-inch schedule 80 pipe, with the cylinder 964 of the traveler assembly being 3-inch schedule 80.

The disks 930, 932 of the idler roller may have an 8.5-inch radius, with the idler roller itself being 8 inch schedule 80 pipe with bonded 0.125 neoprene. All this pipe may be 6351-T6 aluminum.

Flange block bearings 920, 922, 924, 926 may be chosen to be a Browning FB 350 flange block bearings available from Stultz Fluid Power Westbrook, Me., or equivalent.

Gear box 990 may be a Browning worm gear number 26241-10E, and chain 994 may be a #50 chain. Chain sprocket 992 may be a 3.58 pitch diameter sprocket. Suitable hydraulic motors for controlling the gear box, and for controlling the upper roller, are Char-Lynn 2000 Series motors from Stultz Fluid Power of Westbrook, Me.

The idler roller 912 is located 8.5 feet above the deck of the carrier vessel, and approximately 11 feet above water level W. The upper roller 914 is located one foot, 10.5 inches above the idler roller 912. The carrier rod 962 is located one foot 11.3125 inches above the upper roller 914, providing enough room for the spacer float to go between the upper and lower rollers. The inner distance between first and second vertical support members 902, 904 is 17 feet 7 inches. Top member 906 may advantageously be in the form of the top three sides of a regular trapezoid, with the inner height of the trapezoid being 2 feet, 8.5 inches, and the vertical downward projection of the non-parallel sides of the trapezoid being 4 feet, 8.75 inches.

Figure 10E:
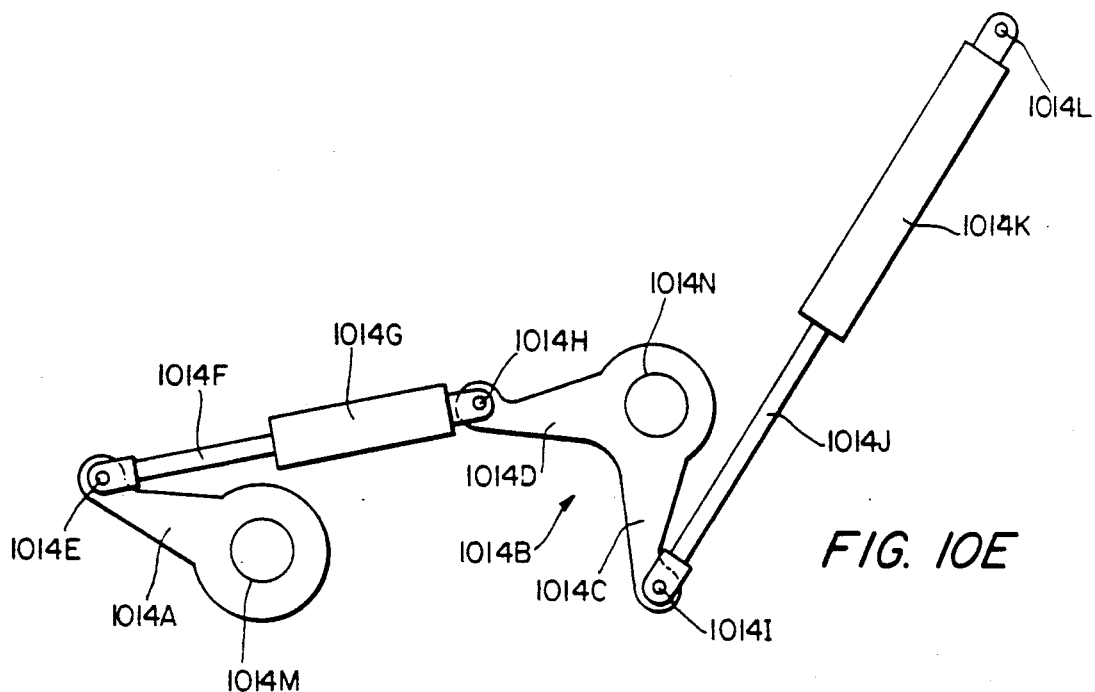
FIG. 10E illustrates a tandem hydraulic cylinder arrangement which may control the crane's swivel.

FIG. 10A illustrates the hydraulic crane 410 useful in embodiments of the present invention. FIGS. 10B, 10C, and 10D illustrate side, top, and end views, in partial cutaway form, of a drive wheel assembly 1002 used to control the rotation of various reels in the hold of the carrier vessel. Certain elements (such as cylinders) are purposely omitted from FIG. 10B for purposes of clarity. FIG. 10E illustrates a tandem hydraulic cylinder arrangement which may be used to control the swivel of the crane.

FIG. 10A is a side view of the hydraulic crane 410 according to a preferred embodiment. As briefly described above, with respect to FIG. 6A, the crane may be a knuckle-type hydraulic crane 410 which comprises inner section 610 and outer section 612.

The position of inner section 610 is controlled by an inner section hydraulic cylinder assembly including cylinder 1004. Hydraulic cylinder 1004 is connected to a rod 1006 which terminates at a pivot 1008. The opposite end of the inner section hydraulic cylinder assembly is connected to the crane's inner section 610 at a cylinder pivot 1010. The lower pivot 1008 is connected to a swivel arrangement 1014 on the deck of the carrier vessel. The inner section 610 is provided with a main pivot 1012 which is also connected to the swivel arrangement 1014. Throughout FIGS. 10A, 10B, 10C, 10D and 10E, hydraulic lines and associated control mechanisms are not shown for purposes of graphic clarity, but may be designed in accordance with considerations known to those skilled in the art.

In operation, the crane's inner section pivots about main pivot 1012 by hydraulically controlled movement of hydraulic cylinder 1004 along rod 1006. Inner section 610 pivots about main pivot 1012 in an arc 1016. As inner section hydraulic 1004 is moved downward on rod 1006, the crane inner section 610 moves downward and aft, in the direction of the hold 406 containing the reels of boom sections. Conversely, as the hydraulic cylinder 1004 moves upward along rod 1006, the crane's inner section 610 moves upward and forward, away from the carrier's hold 406. Inner section hydraulic cylinder 1004 may advantageously be a PMC21036 (5×36 inch) hydraulic cylinder.

The crane's outer section 612 is controlled in a similar manner. An outer section hydraulic cylinder 1018 is connected to a rod 1020 which terminates in a top pivot 1022 which is at the upper end of crane inner section 610. A center pivot 1024 is provided at the lower end of the hydraulic cylinder assembly which includes cylinder 1018. The center pivot 1024 is provided at an extreme outer end of a connecting arm 1028 whose other end is securely affixed (for example, by welding) to a point just above the center of crane outer section 612. Crane outer section 612 pivots about the main pivot 1030 which is located approximately 10 percent of the way down crane inner section 610.

In operation, outer section hydraulic cylinder 1018 moves up and down rod 1020 to thereby control the angular orientation of outer section 612 along an arc 1032. As the cylinder 1018 moves up rod 1020, outer section 612 pivots upward about main pivot 1030, as connecting arm 1028 pulls the outer section's mass upward. Similarly, as cylinder 1018 moves downward on rod 1020, the crane's outer section 612 moves downward, closer to the reels in the carrier's hold 406. Outer section hydraulic cylinder 1018 may advantageously be a King SAE 9530 (5×30 inch) cylinder, whose control and operation lie within the ability of those skilled in the art.

The swivel arrangement 1014 allows the entire crane 410 to swivel about a substantially vertical axis, thereby allowing the crane to point at any reel in the carrier's deck. The swivel arrangement 1014 may be designed in accordance with principals known to those skilled in the art. Briefly, however, the swivel arrangement may comprise a circular base fixed to the deck, a vertically oriented axial rod penetrating the center of the base, and a cylindrically shaped moving member which surrounds and rotates about the axial. The cylindrically shaped moving member receives rod 1006 at pivot 1008, and crane inner section 1016 at main pivot 1012.

A Prentice base or one of similar construction may be used. See, for example, U.S. Pat. No. 3,399,786 (Honeycutt), incorporated herein by reference. The Prentice base may be used, with a possible adaption of tandem hydraulic cylinders to provide turning force instead of a hydraulic motor with ring and pinion gears. The portion of this adaptation related to the tandem hydraulic cylinders is shown in FIG. 10E.

FIG. 10E is a top view of a preferred tandem cylinder arrangement, with the top of the drawing pointing forward on the carrier. The arrangement may advantageously be positioned on the underside of the deck of the carrier, in an accessible compartment such as the engine room. The arrangement includes a main tiller 1014A, and an idler tiller 1014B comprising arms 1014C and 1014D. A first hydraulic cylinder arrangement including piston 1014F and cylinder 1014G connects pin 1014E near the outer end of tiller 1014A and pin 1014H at the outer end of arm 1014D. A second hydraulic cylinder arrangement including piston 1014J and cylinder 1014K connects arm 1014C at pin 1014I to a stationery pin 1014L. Main tiller 1014A rotates about a shaft aperture 1014M while supporting the crane base. Idler tiller 1014B rotates about a shaft aperture 1014N under control of hydraulic cylinder 1014K.

Preferably, a heavy tubing or pipe forming a stub shaft penetrates the center of aperture 1014M, and projects downwardly therethrough from the underside of the deck. A Browning split taper bushing (not shown) with its narrow end projecting upward also penetrates and fits snugly within aperture 1014M, and is compressed by the aperture's inner surface to grasp the stub shaft as it is forced upwardly through the aperture. In this manner, the shaft rotates with tiller A without slippage. Preferably, a Browning split taper bushing "W1" may be used, and is available from Browning Mfg. Division, Emerson Electric Co., Maysville, Ky.

A stub shaft also projects downwardly through the center of aperture 1014N in the idler tiller 1014B. A bronze bushing adapts the shaft to the aperture, and is kept in place vertically by a thrust collar functioning as a heavy washer beneath the bushing.

Cylinder 1014G may be a King SAE-9310 (3.5×10 inch) cylinder; cylinder 1014K may be a King SAE-9320A (3.5×20 inch) cylinder. The maximum stroke distance between the cylinder and forks surrounding pins 1014E and 1014I are 10 inches and 20 inches, as illustrated by visible sections of pistons rods 1014F and 1014J, respectively. The radial distance between pin 1014E and the center of aperture 1014M is 13.75 inches; the radial distance between pins 1014H, 1014I and the center of aperture 1014N is also 13.75 inches. Pin 1014I is offset 30.75 inches to the right, and 2.75 inches down, from the center of aperture 1014M; pin 1014I is illustrated directly below the center of aperture 1014N. Pin 1014L is located 27.75 inches to the right of a line including the center of aperture 1014N and pin 1014I as illustrated in FIG. 10E, which shows the cylinder assemblies in their maximally extended positions. The hub diameter of tiller 1014A is 5.5 inches to accommodate the Browning split taper bushing; similarly, hub diameter of the idler tiller 1014B is 4.5 inches to accommodate a bronze bushing as a bearing surface.

Reasons for adapting the Prentice base to include the tandem cylinders include the fact that the crane need not rotate a complete circle, and would be stronger and better able to stand the side load and backlash present when the carrier was heeled over or rolling in a seaway. It is simple and easy to maintain in its position over the engine room forward of the hold.

The reason for using two cylinders through an idler tiller is to achieve the 130° swing not possible with a single cylinder. The important feature of the preferred crane bases is the ability to support the load and still allow it to turn.

In operation, hydraulic pressure may be supplied to the cylinders through a tee so they may work together or separately, the work being shared, depending on the respective amount of leverage available to the two cylinder assemblies in the given configuration. The cylinder assembly that contributes more torque is the one whose rod centerline is furthest from the center of rotation of its respective tiller.

Returning to discussion of FIG. 10A, those skilled in the art will readily recognize that the positioning of the drive wheel assembly 1002 may be accurately controlled by proper control of the swivel arrangement 1014, inner hydraulic cylinder 1004, and outer section hydraulic cylinder 1018. By controlling the swivel arrangement 1014, an operator may point the entire crane at a particular reel. By controlling inner hydraulic cylinder 1004, he generally positions the crane's inner section the proper distance from the swivel arrangement; the proper distance is determined by whichever reel is desired to be controlled by the crane's drive wheel assembly 1002. The operator also controls outer section hydraulic cylinder 1018 to determine the height of the crane's outer section and the drive wheel assembly 1002 at its end.

As is appreciated by those skilled in the art, the rotation of the crane 410 about its swivel arrangement's axis causes the drive wheel assembly 1002 to assume a slightly different angle for different reels positioned in different locations in the carrier's hold. To obtain greater control of the rotation of individual reels, the orientation of the drive wheel in the drive wheel assembly 1002 is advantageously controlled to be parallel to the end disks of the reels. The drive wheel assembly 1002 provides controllable positioning of the drive wheel 848 so that it does not slip off the edges of the disks as they rotate. The details of a preferred drive wheel assembly 1002 are now described in greater detail, with special reference to FIGS. 10B, 10C, and 10D.

FIGS. 10B, 10C, and 10D are respective side, top plan, and end views of the drive wheel assembly 1002. FIG. 10C most clearly illustrates the pivoting of the drive wheel 848 in the horizontal direction about an arc 1088; FIG. 10D most clearly illustrates the pivoting of the drive wheel in a vertical arc 1094. FIG. 10C is a partially exploded top view, with the drive wheel assembly shown removed from the crane's outer section 612 for purposes of illustration.

A bracket 1046 is permanently affixed to the lower end of the crane's outer section 612. A vertical motion hydraulic cylinder assembly comprising a vertical motion hydraulic cylinder 1048, rod 1050, fork 1052, and second fork 1054 is operably connected to the bracket 1046 via a clevis pin 1056. Bracket 1046 is the anchor and pivot for cylinder 1048, and is permanently affixed to crane member 612 by welding. Clevis pin 1056 penetrates fork 1054 so as to contain a ring-shaped extension 1047 at the end of bracket 1046.

Fork 1052 is operably connected to tiller arm 1060 via a pin 1062 which penetrates both elements. A frame 1058 comprises major horizontal member 1058A, a vertical member 1058B, and a minor horizontal member 1058C and the bottom horizontal member 1058D. The tiller arm 1060 is fixed to vertical member 1058B, for example by welding.

A horizontal motion hydraulic cylinder assembly comprises a horizontal motion hydraulic cylinder 1068, rod 1070, fork 1072, and second fork 1074. Fork 1074 surrounds minor horizontal member 1058C, and both are penetrated by pivot 1076 to allow the horizontal motion hydraulic cylinder assembly to rotate with respect to the horizontal member 1058C. Fork 1072 surrounds an end of a connecter arm 1080, with both being penetrated by pivot 1078 so that the horizontal motion hydraulic cylinder assembly may also rotate with respect to the connector arm 1080. Connector arm 1080 is permanently affixed to a top plate 1082A, which is parallel to and permanently affixed to major horizontal member 1058A. A substantially vertically oriented king pin 1086 penetrates top plate 1082A and 1058A and extends downward to penetrate a corresponding bottom plate 1058D and 1082B. Extending between the outer surfaces of top and bottom plates 1082A, 1082B, is a side plate 1090. Side plate 1090 is arranged substantially parallel to the drive wheel 848, and is penetrated by an axle which connects the drive wheel to a motor 1096. Motor 1096 rotates and brakes drive wheel 848 and serves as an axle for the wheel flange 1092, and is controlled form the main control station 620, FIG. 6A.

A bolt 1044 penetrates a 0.75-inch plate on the end of boom 612 and a 0.5-inch teflon thrust plate 1042, and then penetrates 1058B and is threadably engaged by a flange nut 1066. A washer 1064 is seated between the flange nut 1066 and the vertical member 1058B, with the vertical member pressing against teflon plate 1042 on the crane's outer section 612.

In operation, the drive wheel 848 is positioned as follows. Referring especially to FIG. 10C, as the horizontal motion hydraulic cylinder 1068 moves along rod 1070, the drive 848 pivots about king pin 1086 along an arc 1088. Rotation of the drive wheel and knuckle 1082A, 1082B, 1090, and motor 1096 is accomplished through the force of rod 1070 pressing against tiller arm 1080 via pivot 1078. Through the action of horizontal motion hydraulic cylinder 1068, rod 1070 is controlled to position the connecting arm so that the drive wheel is at the proper angle along arc 1088. The particular angle along arc 1088 is determined in accordance with whichever reel in the carrier's hold the drive wheel is to contact. In the preferred embodiment, the drive wheel may pivot in a horizontal plane approximately 70°. This range of angular orientation allows the drive wheel to parallel the rims of any of the reels in the hold.

Referring now especially to FIG. 10D, the vertical tilt of the drive wheel is controlled through the action of vertical motion hydraulic cylinder 1048 along rod 1050. As rod 1050 is displaced further from the cylinder through the hydraulic action of the cylinder, tiller arm 1060 rotates vertical frame member 1058B to rotate about bolt 1044; the wheel assembly rotates about bolt 1944. Drive wheel 848 is thus positioned at a given angle along arc 1094. Extending rod 1050 in a direction away from the cylinder causes a downward tilt, whereas withdrawing rod 1050 into cylinder 1048 causes an upward tilt of the drive wheel. The drive wheel may pivot in a vertical plane approximately 60°.

In the preferred embodiment, the hold is 17 feet 8 inches wide, 20 feet 8 inches long, and the center of the swivel arrangement 1014 is located along a longitudinal center line of the hold. A crane swivel capability of 130°, drive wheel pivot capability of 70°, and drive wheel tilt capability of 60°, together allow the drive wheel to contact the rim of any reel in the hold. The two forward outside reels require the most angle on wheel 848. The inner rim of the outside reel is 5 feet out from the center and 5.5 feet aft the center of crane base. Of course, application of the rules of geometry as known to those skilled in the art will allow variations of the illustrated arrangement of reels, swivel capability, and drive wheel tilt and pivot capability.

Vertical tilting of wheel 848 allows it to contact the reel rims in an upright position. Washer 1064 and teflon thrust plate 1042 serve as bearing surfaces as 1058A rotates.

Vertical tilt of the drive wheel is highly desirable, although a drive wheel can be made to parallel any of the rims simply through controlling its pivoting angle in a horizontal plane (FIG. 10C). Drive wheel 848 could contact the rims without the vertical tilt, but with it a more precise control is possible, especially when intermittent contact is required. Vertical tilt also allows contact in an upright position instead of an angle.

A worm gear 860 is powered by hydraulic motor 862 (FIG. 8B), both of which are located on the outer arm 612 of the crane and are not visible in FIG. 10A. The worm drive has a 30-to-1 reduction ratio, and is coupled to the winch drum 1026 (FIG. 10A) around which is wound a cable. The motor and worm gear control cable 1037 as the cable wraps around the forward end of a first sheave 1036, thence downward and forward to wrap around sheave 1038 to hang down, the cable terminating in a clevis structure 1039. The clevis structure is bolted to a spreader bar, and grips reels to load and unload them from the hold. Sheave 1036 is the main sheave for the hydraulic winch cable. Sheave 1038 is an idler that keeps the cable clear of the end of boom 612 when it is in the most downward position. Sheaves 1036 and 1038 are provided with respective sheave axes 1036A and 1038A (FIG. 10C).

This arrangement of the motor worm gear, cable, and sheaves is used to load and unload reels, to launch and haul the tender, and to perform other lifting or pulling jobs. It may have about a 4000 lb. single line pull, and can be increased or decreased with a relief valve in the appropriate hydraulic feed line.

All hydraulic, steering and engine controls may advantageously be centralized in the control station 620 (FIG. 6A). One man could handle deployment of the booms; however, in retrieval it would be better to have one man on steering and engine, and another on the hydraulics for extra control of the powered roller, traveler assembly and reel drive.

Advantageously, drive wheel assembly 1002 may be easily removed from the crane. Clevis pin 1056 and flange nut 1066 are removed, freeing the assembly from the crane.

The components of the drive wheel assembly may be manufacture of the following materials:

Elements 1046, 1058A, 1058B, 1058D, 1080, 1082A, 1082B and 1090 may be all either 0.5-inch or 0.625-inch 6061-T651 aluminum plate. Element 1058C should be 1". Element 1047 may be built up to 1", as would 1060 where penetrated by pins 1056, 1062 and 1078. Cylinders 1048 and 1068 may be S.A.E. 7008 2.5"×8". Bolt 1044 may be stainless steel, and flange nut 1066 may be silicon bronze. Kingpin 1086 may be stainless steel. The motor 1096 may be a Char-Lynn 2000 series wheel motor, 6.2 cu. in. The cylinders and motor are available from Stultz Fluid Power, 401 Riverside Street, Portland, Me. 04013. The thrust plate and washer are 0,5-inch Teflon. The wheel and tire 848 may be a 14 or 15" automobile type tire.

Figure 11A:
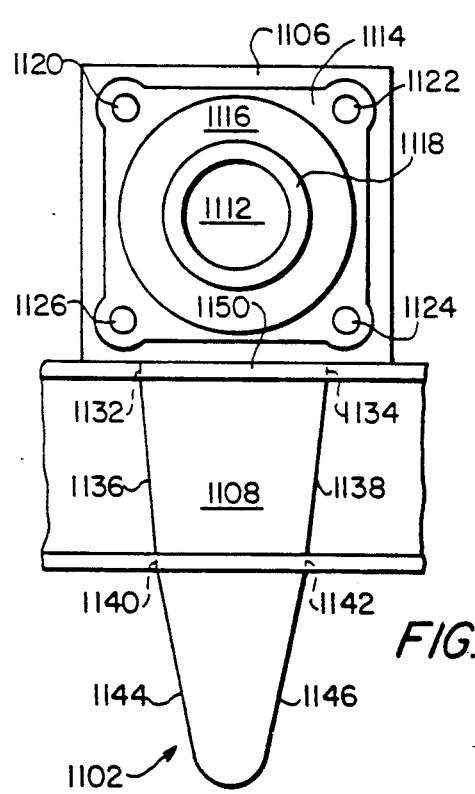
FIGS. 11A and 11B are front and side views, respectively, of the preferred reel bearing mount 1102 and reel bearing anchor 1104 according to the present invention.
Figure 11B:
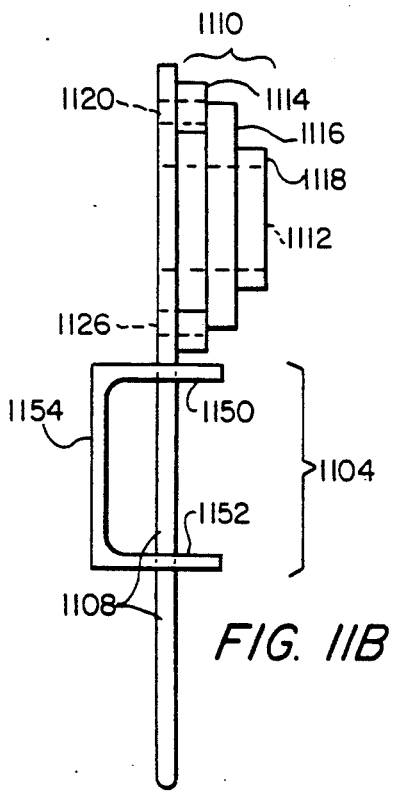
Figure 11C:
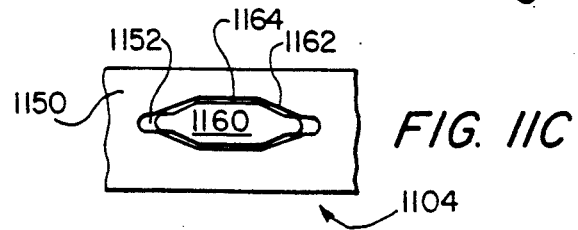
FIG. 11C is a top plan view of a section of the reel bearing anchor 1104.

FIGS. 11A and 11B are front and side views, respectively, of the preferred reel bearing mount 1102 and reel bearing anchor 1104 according to the present invention. FIG. 11C is a top plan view of a section of the reel bearing anchor 1104. These elements are found in the holds of both the carrier and tender vessels for holding reels of oil boom sections in a compact and easily loadable manner.

Referring now especially to FIGS. 11A and 11B, reel bearing mount 1102 includes a square upper plate 1106 affixed to (or is an integrally formed extension of) a tongue 1108. A flange block bearing 1110 is affixed to the square upper plate 1106, and both are provided with a cylindrical aperture 1112 for receiving the end of the axis of a reel. The bearing 1110 includes three attached plates 1114, 1116, and 1118. Plate 1114 is a substantially rectangular plate, having an area slightly smaller than that of square upper plate 1106. Plate 1114 has near its four corners apertures 1120, 1122, 1124, and 1126 for receiving bolts to attach the bearing 1110 to the square upper plate 1106. Plates 1116 and 1118 are progressively smaller disks, each centered about aperture 1112, with the larger disk 1116 being smaller than plate 1114 to allow bolts to be applied to apertures 1120, 1122, 1124, and 1126. Plates 1116 and 1118 are outer and inner races, respectively, of this bearing, preferably a ball bearing.

The bottom portion of reel bearing mount 1102 is a tongue 1108. Tongue 1108 is a planar member having four portions. The first portion is rigidly attached to, or is an integral continuation of, the bottom of square upper plate 1106; the sides of first portion of tongue 1108 are defined by upper, vertical parallel edges 1132, 1134. The second portion of tongue 1108 has upper converging edges 1136, 1138, which are extensions of upper parallel edges 1132, 1134. At the bottom end of upper converging edges 1136, 1138, lower parallel edges 1140, 1142 extend downward to define a third portion of tongue 1108. Finally, the fourth and bottom portion of tongue 1108 has a rounded "V" form, defined by lower converging edges 1144, 1146 which are continuations of lower parallel edges 1140, 1142, respectively.

Tongue 1108 fits snugly within apertures in reel bearing anchor 1104, with square upper plate 1106 resting atop the reel bearing anchor 1104.

The reel bearing anchor 1104 will now be described in greater detail. As illustrated most clearly in FIG. 11B, reel bearing anchor 1104 is presented in cross-section as a squared "C" having anchor top surface 1150 and anchor bottom surface 1152 joined by anchor side member 1154. The anchor top surface 1150, anchor side member 1154, and anchor bottom surface 1152 define the three planar sides of the "C". On the side of anchor side member 1154 opposite that from which anchor top and bottom surfaces 1150, 1152 project, the reel bearing anchor 1104 is firmly affixed (e.g., by bolting) to some structure in the hold of either the carrier vessel or the tender vessel.

As illustrated most clearly in FIG. 11A, reel bearing anchor 1104 extends in the longitudinal direction of the hold of the vessel, and includes an aperture set 1160 (FIG. 11C) for receiving tongues 1108 from a corresponding plurality of reel bearing mounts 1102. In the illustrated embodiment the aperture set 1160 comprises two apertures, defined by edges 1162 and 1164. Each of the apertures is a rounded rectangular opening with the longer dimension oriented longitudinally in the anchor. Regular trapezoidal side extensions widen the rounded rectangles to facilitate initial insertion of the lower end of the tongue.

FIG. 11C illustrates the manner in which tongue 1108 fits into a typical aperture set 1160 in the reel bearing anchor top and bottom surfaces 1150, 1152. The first aperture's edge 1162 is formed in top surface 1150, whereas the second aperture's edge 1164 is formed in bottom surface 1152. The aperture formed by edge 1164 on anchor bottom surface 1152 is smaller in area than the aperture defined by edge 1162 on anchor top surface 1150. The two edges thus form apertures defining a pathway which converges in a downward direction. This size and shape of the apertures allow them to snugly receive the converging form of tongue 1108.

In the illustrated embodiment, aperture set 1160 includes two apertures, formed as described above. However, reel bearing anchors may be manufactured of more than two horizontal members, causing there to be more then two apertures in the aperture set.

Referring again briefly to FIG. 7B, it is seen that only two reel bearing anchors 1104 are required for the tender vessel. The reel bearing anchors are affixed to opposite sides of the tender's hold, each containing two aperture sets 1160 for receiving tongues from the two reels 708, 712.

However, referring to the hold of the carrier vessel in FIG. 8B, it is seen that four pairs of reel bearing anchors 1104 are required, each reel bearing anchor having five aperture sets 1160. Paired reel bearing anchors are located a distance apart from one another which allows five reel assemblies to be placed between them, inserted into aperture sets which are disposed opposite one another on the paired reel bearing anchors.

Reels such as the one shown in FIG. 8C are supported by reel bearing mounts 1102 at both ends of the reels' axes, forming reel assemblies. An advantage of the present invention is that reel assemblies with boom sections mounted on them are easily moved. For example, they are loaded and unloaded from the hold of either a carrier vessel or a tender vessel. A crane loads and removes the entire reel assembly, including reel bearing mounts, into and from the holds. The force of gravity securely lodges the reel bearing mount tongues 1108 in the aperture sets 1160 within the reel bearing anchors. No further adjustment or securing of the assemblies is necessary.

This advantage is of particularly importance when large oil spills are encountered. In such large oil spills, an oil boom must be quickly deployed in lengths which are greater than the storage capacity of a single carrier vessel. The size of the carrier vessel is advantageously optimized to provide a combination of speed (for quick arrival at the oil spill) and oil containment capability (determined by the speed of deployment and the overall length of boom which can be deployed). However, when a single carrier may contain insufficient length of boom to contain an oil spill, and another carrier is not available at the geographic location to contain the oil spill in conjunction with the first carrier, ease and speed of reloading the carrier becomes important.

The present invention allows a substantial length of oil boom to arrive quickly at a scene, where the oil boom may be quickly and easily deployed. Assuming that additional oil boom length is required, the carrier may quickly return to a wharf, dock, barge, or other vessel on which a greater supply of reel assemblies is stored. Empty reels are easily removed by crane, simply by lifting the reel assemblies from the hold by lifting upward against the force of gravity. As the reel assemblies are lifted, tongues 1108 are lifted from aperture sets 1160, the aperture sets offering no resistance other than the frictional engagement which secured them in place. Immediately thereafter, the carrier may be loaded with a new complement of reel assemblies containing fresh boom sections. The carrier may return to the sight of the oil spill to further contain it.

The reel bearing mounts may be taken off the reels when they leave the carrier for temporary or permanent storage; they may be put on new reels at time of loading. There is enough clearance between the shaft and bearing so they can slip on and off by hand.

Modifications and variations of the above-described embodiments of the present invention are possible, as appreciated by those skilled in the art in light of the above teachings. For example, a number of inflated chambers may be employed, other than the two chambers 102, 104 shown in the preferred embodiment. Also, materials other than neoprene, and dimensions other than those given above, may be chosen. It is therefore to be understood that, within the scope of the appended claims and their equivalents, the invention may be practiced otherwise than as specifically described.

What is claimed is:

1. A reel assembly especially suitable for holding a section of an oil boom, comprising:
   a) a substantially cylindrical drum having a slot allowing access with an at least partially hollow interior of the drum, the drum adapted to have wound on it the section of oil boom, the boom section having first and second ends, the first end adapted to be inserted into the interior of the drum and having one or more apertures adapted to receive one or more corresponding valve assemblies but having no such valve assemblies inserted therein, a substantial length of the boom section being wound substantially tightly about the drum, the second end of the boom section having one or more valve assemblies inserted therein;
   b) an axis which is concentric with the drum and around which the drum may rotate; and
   c) reel mounts including:
      1) bearings adapted to receive opposite ends of the axis and support the axis as it rotates; and
      2) downwardly projecting tongues adapted to fit in respective apertures on a carrier or tender vessel for holding and stabilizing the position of the reel assembly, the tongues being generally flat and having opposite broad faces which are generally "V"-shaped and a narrower edge which joins the opposite broad faces so as to form the tongue, the vertex of the "V" being pointed downward in use, thus allowing the reel assembly as a whole to be easily inserted or removed from the hold of the vessels and permitting rapid deployment and retrieval of the boom section.

2. A reel assembly especially suitable for holding a section of an oil boom, comprising:
   a) a substantially cylindrical drum;
   b) an axis which is concentric with the drum and around which the drum may rotate; and
   c) reel mounts including:
      1) bearings adapted to receive opposite ends of the axis and support the axis as it rotates; and
      2) downwardly projecting tongues adapted to fit in respective apertures for holding and stabilizing the position of the reel assembly, the tongues being generally flat and having opposite broad faces which are generally "V"-shaped and a narrower edge which joins the opposite broad faces so as to form the tongue, the vertex of the "V" being pointed downward in use.

3. The reel assembly of claim 2, further comprising:
   the section of oil boom, the boom section having first and second ends, the first end adapted to be inserted into the interior of the drum and having one or more apertures adapted to receive one or more corresponding valve assemblies but having no such valve assemblies inserted therein, a substantial length of the boom section being wound substantially tightly about the drum.

4. The reel assembly of claim 3, wherein:
   the second end of the boom section has one or more valve assemblies inserted therein.

5. The reel assembly of claim 2, further comprising:
   two end disks, substantially perpendicular to the axis and drum and arranged at respective opposite ends thereof.

6. The reel assembly of claim 5, further comprising:
   two substantially annular rims at or comprising the periphery of the respective two end disks.

7. The reel assembly of claim 6, wherein:
   the two rims have a thickness greater than that of the end disks.

8. The reel assembly of claim 2, further comprising:
   at least one interior disk, disposed within the drum and oriented substantially perpendicular to the axis and contacting an interior surface of the drum, the at least one interior disk providing support for the drum.

9. The reel assembly of claim 2, wherein:
the downwardly projecting tongues have horizontal dimensions at two vertical heights which substantially match respective dimensions of the two apertures in reel bearing anchors adapted to receive the tongues.

10. The reel assembly of claim 2, wherein:
the drum has a slot allowing access with an at least partially hollow interior of the drum.

11. The reel assembly of claim 10, wherein:
the slot is longer in a direction parallel to the axis so as to allow a first end of boom section to fit in the interior of the drum.

12. The reel assembly of claim 11, wherein:
the slot occupies approximately 53 circumferential degrees.

13. A method of loading a reel assembly into a vessel, the reel assembly including a substantially cylindrical drum extending between reel mounts having downwardly projecting generally "V" shaped tongues adapted to fit in respective sets of first and second apertures for holding and stabilizing the position of the reel assembly, and in which the vessel includes reel bearing anchors having the apertures, the method comprising:
positioning the reel assembly above the first apertures so that bottom ends of the tongues fit first through respective first apertures and then through respective second apertures, the second apertures being positioned below the first apertures and having horizontal dimensions smaller than those of the first apertures; and
allowing gravity to pull the tongues deeper into the first and second apertures.

14. The method of claim 13, wherein:
the guiding step includes guiding each tongue through the respective second aperture of smaller size than the respective first aperture, so that the generally "V" shaped tongues fit snugly within respective sets of first and second apertures.

15. The method of claim 13, further comprising:
inserting a first end of an oil boom into a slot in the drum, so as to protect the end of the oil boom.

* * * * *